US011599420B2

(12) United States Patent
Danilov et al.

(10) Patent No.: US 11,599,420 B2
(45) Date of Patent: Mar. 7, 2023

(54) ORDERED EVENT STREAM EVENT RETENTION

(71) Applicant: EMC IP Holding Company LLC, Hopkinton, MA (US)

(72) Inventors: Mikhail Danilov, Saint Petersburg (RU); Igor Medvedev, Seattle, WA (US); Lu Lei, Shanghai (CN); Julius Jian Zhu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 133 days.

(21) Appl. No.: 16/944,094

(22) Filed: Jul. 30, 2020

(65) Prior Publication Data

US 2022/0035709 A1   Feb. 3, 2022

(51) Int. Cl.
*G06F 11/00*   (2006.01)
*G06F 11/14*   (2006.01)
(Continued)

(52) U.S. Cl.
CPC ........ *G06F 11/1407* (2013.01); *G06F 9/3555* (2013.01); *G06F 9/3857* (2013.01);
(Continued)

(58) Field of Classification Search
CPC ............. G06F 11/1407; G06F 11/1471; G06F 11/3024
See application file for complete search history.

(56) References Cited

U.S. PATENT DOCUMENTS 3,617,587 A   11/1971   Nayar et al.
5,826,977 A   10/1998   Fowler et al.
(Continued)

FOREIGN PATENT DOCUMENTS

CA   2 534 170 A1   7/2007
CA   2672879       4/2008
(Continued)

OTHER PUBLICATIONS

Akidau et al., "MillWheel: Fault-Tolerant Stream Processing at Internet Scale" Proceedings of the VLDB Endowment, vol. 6, No. 11, 2013, 12 pages.
(Continued)

*Primary Examiner* — Joshua P Lottich
(74) *Attorney, Agent, or Firm* — Amin, Turocy & Watson, LLP

(57) ABSTRACT

Retention of events of an ordered event stream is disclosed. Expiration of events stored in a segment of an ordered event stream (OES) can be desirable. New events are added to a head of an OES segment, and pruning events from a tail of the OES segment can be valuable. Processing applications can register a processing scheme for a segment, e.g., at-least-once processing, exactly-once processing, etc., and can generate checkpoints indicating a degree of advancement in processing events of the segment. The ordered event stream can determine a cut point indicative of a progress point, that before which, events of an OES can be marked as ready for expiration. However, events that are marked for expiration can be retained to allow processing based on a checkpoint, e.g., expiration of the event can be refused until there is an assurance the event was read by the processing application.

20 Claims, 10 Drawing Sheets

(51) Int. Cl.
*G06F 11/30* (2006.01)
*G06F 9/38* (2018.01)
*G06F 9/355* (2018.01)
*G06F 9/54* (2006.01)

(52) U.S. Cl.
CPC .......... *G06F 9/542* (2013.01); *G06F 11/1471* (2013.01); *G06F 11/3024* (2013.01)

(56) References Cited

U.S. PATENT DOCUMENTS

| | | |
|---|---|---|
| 7,340,690 B2 | 3/2008 | Lau |
| 7,430,570 B1 | 9/2008 | Srinivasan et al. |
| 7,610,437 B2 | 10/2009 | Sinclair et al. |
| 7,769,717 B2 | 8/2010 | Federwisch et al. |
| 7,984,084 B2 | 7/2011 | Sinclair |
| 8,285,918 B2 | 10/2012 | Maheshwari |
| 8,443,263 B2 | 5/2013 | Selinger et al. |
| 8,572,091 B1 | 10/2013 | Sivasubramanian et al. |
| 8,655,825 B2 | 2/2014 | Roesch et al. |
| 8,732,403 B1 | 5/2014 | Nayak |
| 8,825,848 B1 | 9/2014 | Dotan et al. |
| 8,873,284 B2 | 10/2014 | Sinclair et al. |
| 8,984,248 B2 | 3/2015 | Morishita et al. |
| 9,223,693 B2 | 12/2015 | Sinclair et al. |
| 9,336,133 B2 | 5/2016 | Sinclair et al. |
| 9,348,746 B2 | 5/2016 | Sinclair et al. |
| 9,407,521 B1 | 8/2016 | Kulkarni |
| 9,465,731 B2 | 10/2016 | Sinclair et al. |
| 9,514,018 B2 | 12/2016 | Sikri |
| 9,591,316 B2 | 3/2017 | Bracha et al. |
| 9,639,589 B1 | 5/2017 | Theimer et al. |
| 9,715,434 B1 | 7/2017 | Xu et al. |
| 9,734,050 B2 | 8/2017 | Sinclair et al. |
| 9,734,911 B2 | 8/2017 | Sinclair et al. |
| 9,753,932 B1* | 9/2017 | Brow ................ G06F 11/1469 |
| 9,778,855 B2 | 10/2017 | Sinclair |
| 9,892,803 B2 | 2/2018 | Reed |
| 9,898,482 B1 | 2/2018 | Bono |
| 9,965,215 B1 | 5/2018 | Vazhenin et al. |
| 10,108,543 B1 | 10/2018 | Duggal et al. |
| 10,108,544 B1 | 10/2018 | Duggal et al. |
| 10,120,613 B2 | 11/2018 | Sinclair et al. |
| 10,133,490 B2 | 11/2018 | Sinclair et al. |
| 10,255,179 B2 | 4/2019 | Ji et al. |
| 10,338,834 B1 | 7/2019 | Dighe et al. |
| 10,430,279 B1 | 10/2019 | Dittia et al. |
| 10,565,208 B2 | 2/2020 | Triou, Jr. et al. |
| 10,628,424 B2 | 4/2020 | Park et al. |
| 10,705,741 B1 | 7/2020 | Varadarajan et al. |
| 10,795,812 B1 | 10/2020 | Duggal et al. |
| 10,860,457 B1 | 12/2020 | Evenson et al. |
| 10,867,033 B2 | 12/2020 | Kere et al. |
| 10,891,228 B2 | 1/2021 | Burow |
| 10,983,715 B2 | 4/2021 | Sharoni et al. |
| 11,016,826 B2 | 5/2021 | Lehmann |
| 11,086,537 B2 | 8/2021 | Byun |
| 11,194,638 B1 | 12/2021 | Danilov et al. |
| 11,314,779 B1 | 4/2022 | Jain |
| 11,354,054 B2 | 6/2022 | Danilov et al. |
| 2004/0199524 A1 | 10/2004 | Rys et al. |
| 2005/0025152 A1 | 2/2005 | Georgiou et al. |
| 2005/0055519 A1 | 3/2005 | Stuart et al. |
| 2006/0036568 A1 | 2/2006 | Moore et al. |
| 2006/0058987 A1 | 3/2006 | Kumar et al. |
| 2007/0033325 A1 | 2/2007 | Sinclair et al. |
| 2007/0047635 A1 | 3/2007 | Stojanovic et al. |
| 2007/0220518 A1 | 9/2007 | Verbowski et al. |
| 2008/0059724 A1 | 3/2008 | Stifter, Jr. |
| 2008/0082596 A1 | 4/2008 | Gorobets |
| 2008/0144079 A1 | 6/2008 | Pandey et al. |
| 2008/0184262 A1 | 7/2008 | Ginis et al. |
| 2008/0189477 A1 | 8/2008 | Asano et al. |
| 2008/0288713 A1 | 11/2008 | Lee et al. |
| 2008/0301135 A1 | 12/2008 | Alves et al. |
| 2009/0182784 A1* | 7/2009 | Rohit ................ G06F 11/1471 |
| 2010/0083098 A1 | 4/2010 | Leme et al. |
| 2010/0088296 A1 | 4/2010 | Periyagaram et al. |
| 2010/0077013 A1 | 5/2010 | Clements et al. |
| 2010/0125553 A1 | 5/2010 | Huang et al. |
| 2010/0125794 A1 | 5/2010 | Hampton et al. |
| 2010/0174881 A1 | 7/2010 | Anglin et al. |
| 2010/0205163 A1 | 8/2010 | Eshghi et al. |
| 2010/0281081 A1 | 11/2010 | Stager et al. |
| 2010/0333116 A1 | 12/2010 | Prahlad et al. |
| 2011/0126099 A1 | 5/2011 | Anderson et al. |
| 2011/0131588 A1 | 6/2011 | Allam et al. |
| 2011/0145473 A1 | 6/2011 | Maheshwari |
| 2011/0161784 A1 | 6/2011 | Selinger et al. |
| 2011/0249147 A1 | 10/2011 | Ishii |
| 2012/0102503 A1 | 4/2012 | Meijer et al. |
| 2012/0109985 A1 | 5/2012 | Chandrasekaran |
| 2012/0151014 A1 | 6/2012 | Gokhale et al. |
| 2012/0198027 A1 | 8/2012 | Hetzler et al. |
| 2012/0259994 A1 | 10/2012 | Gillies et al. |
| 2013/0226931 A1 | 8/2013 | Hazel et al. |
| 2013/0275808 A1* | 10/2013 | McNeeney ......... G06F 9/45558 |
| | | 714/20 |
| 2014/0006465 A1 | 1/2014 | Davis et al. |
| 2014/0089264 A1* | 3/2014 | Talagala ................ G06F 3/065 |
| | | 707/649 |
| 2014/0223115 A1 | 8/2014 | Dinkjian et al. |
| 2014/0325148 A1 | 10/2014 | Choi et al. |
| 2014/0365719 A1 | 12/2014 | Kuzmin et al. |
| 2015/0169449 A1 | 6/2015 | Barrell et al. |
| 2015/0172120 A1 | 6/2015 | Dwarampudi et al. |
| 2015/0205816 A1 | 7/2015 | Periyagaram et al. |
| 2015/0227602 A1 | 8/2015 | Ramu et al. |
| 2015/0261776 A1 | 9/2015 | Attarde et al. |
| 2015/0341212 A1 | 11/2015 | Hsiao et al. |
| 2015/0355862 A1 | 12/2015 | Hayes et al. |
| 2015/0363245 A1 | 12/2015 | Mutschler |
| 2016/0042008 A1 | 2/2016 | Tripathy et al. |
| 2016/0063080 A1 | 3/2016 | Nano et al. |
| 2016/0210061 A1 | 7/2016 | Soncodi et al. |
| 2016/0246713 A1 | 8/2016 | Choi et al. |
| 2016/0321287 A1 | 11/2016 | Luthra et al. |
| 2016/0337435 A1 | 11/2016 | Nigam et al. |
| 2016/0350324 A1 | 12/2016 | Wang et al. |
| 2016/0357476 A1 | 12/2016 | Chen et al. |
| 2017/0038978 A1 | 2/2017 | Li et al. |
| 2017/0075832 A1 | 3/2017 | Bhimani et al. |
| 2017/0075947 A1 | 3/2017 | Kurilov et al. |
| 2017/0123655 A1 | 5/2017 | Sinclair et al. |
| 2017/0177249 A1 | 6/2017 | Kurilov et al. |
| 2017/0177263 A1 | 6/2017 | Das et al. |
| 2017/0177546 A1 | 6/2017 | Heinz et al. |
| 2017/0212891 A1 | 7/2017 | Pundir et al. |
| 2017/0213127 A1 | 7/2017 | Duncan |
| 2017/0255392 A1 | 9/2017 | Nakashima |
| 2017/0289214 A1 | 10/2017 | Cho et al. |
| 2018/0101842 A1 | 4/2018 | Ventura et al. |
| 2018/0121307 A1 | 5/2018 | Braun et al. |
| 2018/0146018 A1 | 5/2018 | Chang et al. |
| 2018/0176244 A1 | 6/2018 | Gervais et al. |
| 2018/0184138 A1 | 6/2018 | Shaw et al. |
| 2018/0189175 A1 | 6/2018 | Ji et al. |
| 2018/0314727 A1 | 11/2018 | Epstein et al. |
| 2018/0329644 A1 | 11/2018 | Das et al. |
| 2018/0332325 A1 | 11/2018 | Kaitchuck |
| 2018/0332365 A1 | 11/2018 | Kaitchuck et al. |
| 2018/0332366 A1 | 11/2018 | Paduroiu |
| 2018/0332367 A1 | 11/2018 | Kaitchuck et al. |
| 2018/0336256 A1 | 11/2018 | Li et al. |
| 2018/0345140 A1 | 12/2018 | Posin |
| 2019/0004863 A1 | 1/2019 | Mainali et al. |
| 2019/0026301 A1 | 1/2019 | Wang et al. |
| 2019/0057138 A1 | 2/2019 | Knowles et al. |
| 2019/0129806 A1 | 5/2019 | Hsu et al. |
| 2019/0138494 A1 | 5/2019 | Inoue |
| 2019/0197173 A1 | 6/2019 | Tahara et al. |
| 2019/0278849 A1 | 9/2019 | Chandramouli et al. |
| 2019/0327297 A1 | 10/2019 | Madani |
| 2019/0332318 A1 | 10/2019 | Gooding et al. |

(56) References Cited

U.S. PATENT DOCUMENTS

| | | |
|---|---|---|
| 2019/0340180 A1 | 11/2019 | Barsness et al. |
| 2019/0349422 A1 | 11/2019 | Dhruvakumar |
| 2020/0034468 A1 | 1/2020 | Lei et al. |
| 2020/0089420 A1 | 3/2020 | Sharoni et al. |
| 2020/0174695 A1 | 6/2020 | Bazarsky et al. |
| 2020/0250172 A1 | 8/2020 | Busjaeger et al. |
| 2020/0310686 A1 | 10/2020 | Truong et al. |
| 2020/0320005 A1 | 10/2020 | Shulman et al. |
| 2020/0344299 A1 | 10/2020 | Sohail et al. |
| 2020/0394196 A1 | 12/2020 | Shivanna et al. |
| 2020/0404011 A1 | 12/2020 | Gervais et al. |
| 2021/0110328 A1 | 4/2021 | Hsiao et al. |
| 2021/0124746 A1 | 4/2021 | Klaedtke |
| 2021/0157520 A1 | 5/2021 | Bavishi et al. |
| 2021/0256029 A1 | 8/2021 | Danilov et al. |
| 2021/0342296 A1 | 11/2021 | Danilov et al. |
| 2021/0342354 A1 | 11/2021 | Danilov et al. |
| 2021/0365211 A1 | 11/2021 | Danilov et al. |
| 2021/0374021 A1 | 12/2021 | Santhakumar et al. |
| 2022/0035533 A1 | 2/2022 | Danilov et al. |
| 2022/0182724 A1 | 6/2022 | Gupta et al. |

FOREIGN PATENT DOCUMENTS

| | | |
|---|---|---|
| CN | 1708029 | 12/2005 |
| CN | 104901958 | 9/2015 |
| CN | 105591926 | 5/2016 |
| GB | 2377038 | 12/2002 |
| WO | 2002101585 | 12/2002 |
| WO | 2004/080067 A1 | 9/2004 |
| WO | 2009014993 | 1/2009 |
| WO | 2015/196281 A1 | 12/2015 |
| WO | 2015191120 | 12/2015 |
| WO | 2018148149 | 8/2018 |

OTHER PUBLICATIONS

Akidau et al., "The Dataflow Model: A Practical Approach to Balancing Correctness, Latency, and Cost in Massive-Scale, Unbounded, Out-of-Order Data Processing" Proceedings of the VLDB Endowment, vol. 8, No. 12, 2015, 12 pages.

"Execution Model" [https://beam.apache.org/documentation/runtime/model/]. The Apache Software Foundation. Retrieved Aug. 26, 2020, 5 pages.

"Apache Beam Programming Guide" [https://beam.apache.org/documentation/programming-guide/]. The Apache Software Foundation Retrieved Aug. 26, 2020, 69 pages.

"What is Apache Flink?—Applications" [https://flink.apache.org/flink-applications.html#building-blocks-for-streaming-applications]. The Apache Software Foundation Copyright 2014-2019, retrieved Aug. 26, 2020, 7 pages.

"What is Apache Flink?—Architecture" [https://flink.apache.org/flink-architecture.html]. The Apache Software Foundation Copyright 2014-2019, retrieved Aug. 26, 2020, 3 pages.

"Stateful Function—Event-driven Application on Apache Flink" [https://flink.apache.org/stateful-functions.html]. The Apache Software Foundation. Copyright 2014-2019, retrieved Aug. 26, 2020, 8 pages.

"What is Apache Flink?—Operations" [https://flink.apache.org/flink-operations.html]. The Apache Software Foundation. Copyright 2014-2019, retrieved Aug. 26, 2020, 3 pages.

"Use Cases" [https://flink.apache.org/usecases.html]. The Apache Software Foundation. Copyright 2014-2019, retrieved Aug. 26, 2020, 5 pages.

"Introduction" [http://kafka.apache.org/intro]. The Apache Software Foundation. Copyright 2017, retrieved Aug. 26, 2020, 6 pages.

"Apache Kafka Quickstart" [http://kafka.apache.org/quickstart]. The Apache Software Foundation. Copyright 2017, retrieved Aug. 26, 2020, 6 pages.

"Use Cases" [http://kafka.apache.org/uses]. The Apache Software Foundation. Retrieved Aug. 26, 2020, 3 pages.

"Architecture Overview" [pulsar.apache.org/docs/en/concepts-architecture-overview/]. The Apache Software Foundation. Copyright 2020, retrieved Aug. 26, 2020, 11 pages.

"Messaging" [pulsar.apache.org/docs/en/concepts-messaging/]. The Apache Software Foundation. Copyright 2020, retrieved Aug. 26, 2020, 32 pages.

"Pulsar Overview" [pulsar.apache.org/docs/en/concepts-overview/]. The Apache Software Foundation. Copyright 2020, retrieved Aug. 26, 2020, 2 pages.

Office Action dated Jan. 29, 2021 for U.S. Appl. No. 16/256,083, 42 pages.

Office Action dated Mar. 21, 2022 for U.S. Appl. No. 16/864,905, 125 pgs.

Muskardin et al., Implementation of Hashing Algorithms in Stream Mining, International Conference on Smart Systems and Technologies (SST), pp. 233-238, 2018, 6 pgs.

Notice of Allowance dated Jun. 28, 2021 for U.S. Appl. No. 16/884,647, 39 pages.

Office Action dated Jun. 29, 2021 for U.S. Appl. No. 16/881,556, 24 pages.

Notice of Allowance dated Aug. 4, 2021 for U.S. Appl. No. 17/200,652, 51 pages.

Office Action dated Oct. 1, 2021 for U.S. Appl. No. 17/127,724, 41 pages.

Notice of Allowance dated Dec. 15, 2021 for U.S. Appl. No. 17/064,747, 54 pages.

Office Action dated Nov. 10, 2021 for U.S. Appl. No. 16/944,089, 75 pages.

Kleppmann, Making Sense of Stream Processing—The Philosophy Behind Apache Kafka and Scalable Stream Data Platforms; Mar. 4, 2016; retrieved from [https://hashingit.com/elements/research-resources/2016-03-04-making-sense-of-stream-processing.pdf] on Nov. 5, 2021, (Year: 2016), 183 pages.

Notice of Allowance dated Feb. 4, 2022 for U.S. Appl. No. 16/915,762, 57 pages.

Office Action dated Oct. 1, 2021 for U.S. Appl. No. 16/915,762, 57 pages.

Office Action dated Jan. 21, 2022 for U.S. Appl. No. 16/864,892, 26 pages.

Notice of Allowance dated Feb. 24, 2022 for U.S. Appl. No. 17/038,079, 55pgs.

Azhar et al., "Efficient selection of access control systems through multi criteria analytical hierarchy process", IEEE, doi: 10.1109/ICET.2012.6375419, 2012, pp. 1-8. (Year: 2012).

Rox et al., "Construction and Deconstruction of Hierarchical Event Streams with Multiple Hierarchical Layers", IEEE, doi: 10.1109/ECRTS.2008.13, 2008, pp. 201-210. (Year: 2008).

Notice of Allowance dated Feb. 18, 2022 for U.S. Appl. No. 17/083,145, 70 pgs.

Notice of Allowance dated Apr. 11, 2022 for U.S. Appl. No. 16/944,089, 87 pages.

J. C. Lee, J. Vance and R. Lysecky, "Hardware-Based Event Stream Ordering for System-Level Observation Framework," in IEEE Embedded Systems Letters, vol. 6, No. 4, pp. 81-84, Dec. 2014, doi: 10.1109/LES.2014.2359154. (Year: 2014).

T. Onishi, J. Michaelis and Y. Kanemasa, "Recovery-Conscious Adaptive Watermark Generation for Time-Order Event Stream Processing," 2020 IEEE/ACM Fifth International Conference on Internet-of-Things Design and Implementation (IoTDI), 2020, pp. 66-78, doi: 10.1109/IoTDI49375.2020.00014. (Year: 2020).

Aloysius K. Mok, Honguk Woo and Chan-Gun Lee, "Probabilistic Timing Join over Uncertain Event Streams," 12th IEEE International Conference on Embedded and Real-Time Computing Systems and Applications (RTCSA'06), 2006, pp. 17-26, doi: 10.1109/RTCSA.2006.52. (Year: 2006).

M. Liu, M. Li, D. Golovnya, E. A. Rundensteiner and K. Claypool, "Sequence Pattern Query Processing over Out-of-Order Event Streams," 2009 IEEE 25th International Conference on Data Engineering, 2009, pp. 784-795, doi: 10.1109/ICDE.2009.95. (Year: 2009).

Office Action dated May 24, 2022 for U.S. Appl. No. 17/237,535, 62 pages.

(56) References Cited

OTHER PUBLICATIONS

Office Action dated Apr. 12, 2022 for U.S. Appl. No. 17/038,102, 48 pages.
Notice of Allowance dated Apr. 27, 2022 for U.S. Appl. No. 17/127,724, 19 pages.
Office Action dated Jul. 8, 2022 for U.S. Appl. No. 16/864,892, 33 pages.
Office Action dated Jul. 15, 2022 for U.S. Appl. No. 16/864,905, 77 pages.
Office Action dated Sep. 30, 2022 for U.S. Appl. No. 17/408,344, 66 pages.
Office Action dated Jul. 21, 2022 for U.S. Appl. No. 17/070,029, 68 pages.
Notice of Allowance dated Aug. 24, 2022 for U.S. Appl. No. 17/152,544, 55 pages.
Office Action dated Sep. 15, 2022 for U.S. Appl. No. 17/383,425, 61 pages.
Phaujdar, "Understanding Event Streams—A Comprehensive Guide 101_Learn Hevo" [https://hevodata.com/learn/understanding-event-streams/] (Feb. 17, 2021) (Year: 2021).
Dhanushka, "Understanding Kafka Topic Partitions" [https://medium.com/event-driven-utopia/understanding-kafka-topic-partitions-ae40f80552e8]—(Mar. 28, 2021) (Year: 2021).
Splunk, "Comparing Pulsar and Kafka" [https://www.splunk.com/en_us/blog/it/comparing-pulsar-and-kafka-how-a-segment-based-architecture-delivers-better-performance-scalability-and-resilience.html]—(Dec. 5, 2017) (Year: 2017).
Non-Final Office Action received for U.S. Appl. No. 17/063,906, dated Oct. 27, 2022, 59 pages.
Notice of Allowance received for U.S. Appl. No. 16/864,905, dated Nov. 30, 2022, 347 pages.
Tony Tung et al., "Topology Dictionary for 3D Video Understanding", IEEE Transactions on Pattern Analysis and Machine Intelligence (vol. 34, Issue: 8, Aug. 2012), Dec. 2011, pp. 1645-1657.
A. Bulut et al., "Distributed data streams indexing using content-based routing paradigm", 19th IEEE International Parallel and Distributed Processing Symposium, Apr. 2005, pp. 1-10.
Notice of Allowance received for U.S. Appl. No. 17/070,029, dated Dec. 2, 2022, 36 pages.
Non-Final Office Action received for U.S. Appl. No. 17/223,263, dated Nov. 28, 2022, 64 pages.
Non-Final Office Action received for U.S. Appl. No. 17/152,558, dated Dec. 7, 2022, 59 pages.
Non-Final Office Action received for U.S. Appl. No. 17/337,940, dated Dec. 30, 2022, 68 pages.

* cited by examiner

ORDERED EVENT STREAM EVENT RETENTION

TECHNICAL FIELD

The disclosed subject matter relates to data storage and, more particularly, to retaining an event of an ordered event stream of a stream data storage system.

BACKGROUND

Conventional data storage techniques can employ an event stream, e.g., storing data corresponding to stream events in a logical order. In a conventional system, an event stream can provide for storing a generally unbounded stream of events whereby a portion of the stored events can then be read out in the order they were stored. One use of data storage is in bulk data storage. Retention of an event stored via an event stream storage system can be desirable, for example, to ensure that event data is not deleted prior to the event data having been read by a process, reader, etc.

DETAILED DESCRIPTION

Figure 1:
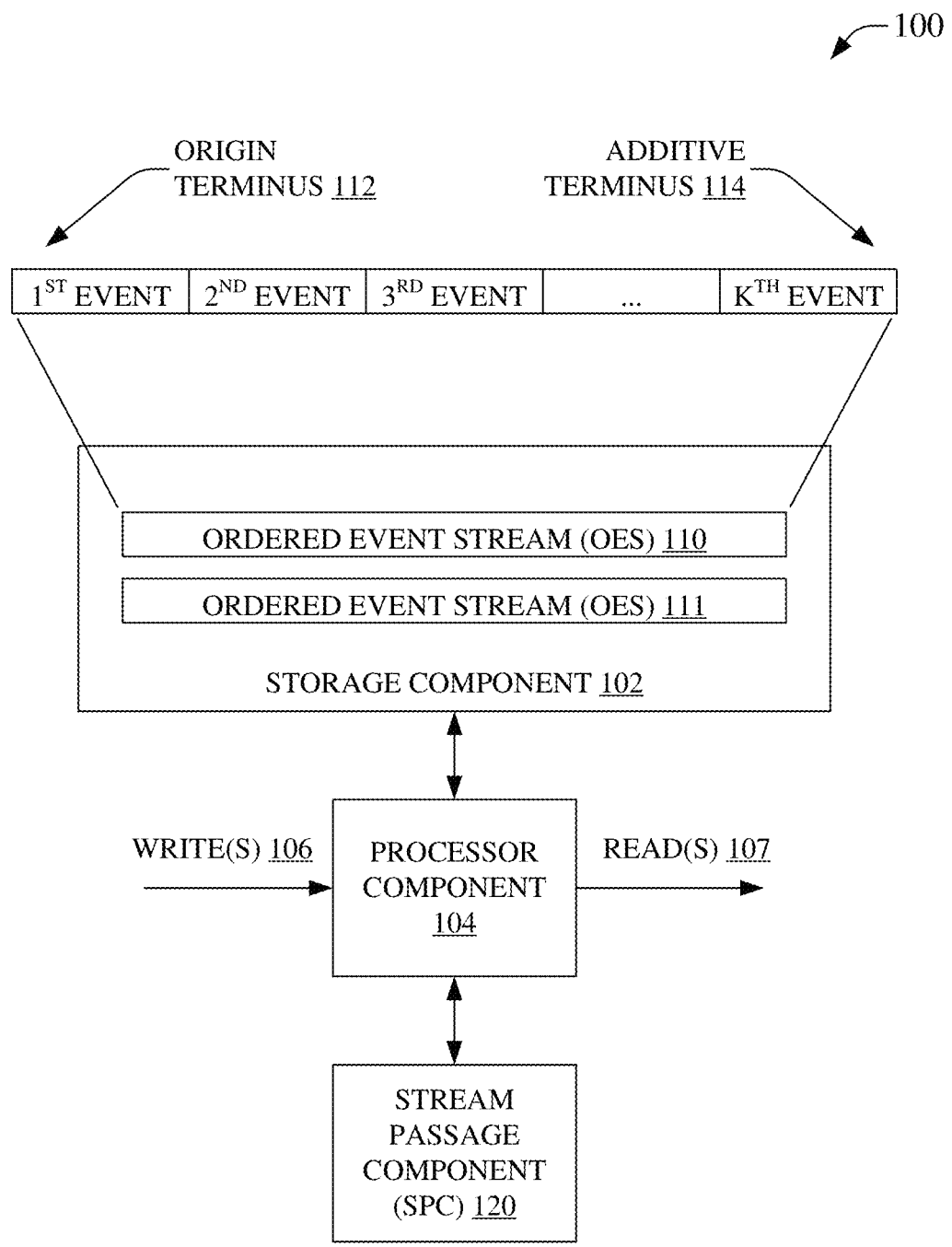
FIG. 1 is an illustration of an example system that can facilitate retention of an event of a segment of an ordered event stream, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As mentioned, conventional event stream storage techniques, for example, can be subject to deletion of events, typically older events of an ordered event stream (OES), for example, to recapture storage space by removing events that have become stale, out of date, irrelevant, etc. However, events can be less accessible and can, on occasion, can fail to be read, typically temporarily. As an example, a storage device can undergo a reboot, during which time events stored there can become inaccessible. As such in this example, an OES storage system can need to return after the example reboot to read the events. It can be appreciated that deleting these events prior to their being readout, e.g., via the system of the present example looping back to read the events after the reboot, can result in loss of data. As such, reading of events can be associated with a reliability mode, sometimes referred to as processing semantics. A processing semantic can indicate an assertion that an event can/will be read in ordered event stream processing.

Typical processing semantics schemes can comprise (1) an 'at-most-once' semantic scheme, which can be a "best-effort" approach wherein it can be asserted that an event will be processed at most once by an application, e.g., read, processed, etc., whereby no retries may be made in case of a failure to access an event; (2) an 'at-least-once' semantic scheme that can assert an event will be processed at least once by an application, resulting in retrying to access an event if there is a possibility that the application has not finished reading, processing, etc., the event, e.g., one event can sometimes be processed more than once; (3) an 'exactly-once' semantic scheme, under which it can be asserted that an event can be processed "exactly once" by an application, even where accessing the event can be subject to various failures, wherein event can be processed at least once, but not twice, thrice, etc., or other schemes. In an aspect, exactly-once semantics can be viewed as an extension of at-least-once semantics, e.g., ensuring reties to read a less accessible event but also limiting retries to one successful reading, processing, etc. As an example of employing an 'at-least-once' semantic, a storage administrator can configure automatic expiration of stream data, e.g., causing automatic deletion of older events based on a selected threshold value, using some assumption on the stream processing application throughput. If the assumption is broken because, for example, the application was down for a period, stream data might be deleted before it was processed by the application. As such, applying 'at-least-once' semantics can prevent automatic deletion of unread events until they have been read at least once. Of note, the subject disclosure discuses event retention in terms of 'at-least-once' semantics, however, 'at-most-once' and 'exactly-once' semantics are to be considered within the scope of the instant disclosure even where not explicitly discussed for the sake of clarity and brevity. As such, the disclosed subject matter can typically assure that no stream data, e.g., event, is removed until all registered stream processing applications, e.g., a reader, reader group, etc., that require at-least-once semantics have processed the stream data.

In an aspect, a stream processing application, e.g., a reader a reader group, etc., can declare a processing semantic when the application registers with an OES storage system. Accordingly, lack of a registered application, lack of a declared processing semantic, etc., e.g., no indication of an at-least-once semantic for an OES of an OES storage system, can result in the OES storage system imposing no new restrictions on OES truncation, e.g., events can be freely deleted from an OES where there has been no indication that an OES event should be retained according to a processing semantic. In an aspect, at least one application, e.g., with at-least-once semantics, exactly-once semantics, etc., can register with an OES system, wherein the OES system can make sure that stream data, e.g., events, etc., do not expire, become deleted, are truncated, etc., until they have been read, processed, etc., at least/most once. Accordingly, an application can persist a checkpoint to indicate progress in a stream, or portion thereof. This checkpoint can be used as an indicator of where in an OES, or portion thereof, an application has reached, e.g., before the checkpoint has already ben read at least once and after the checkpoint an OES may not yet have been read once. In an aspect, the checkpoint can act as a start position to begin reading, processing, etc., e.g., after an application has restarted, after an event becomes available again, etc. It is noted that events after the checkpoint can have been read, but may not have been, however the checkpoint can be regarded as assuring that events before the checkpoint have been read at least once, e.g., events occurring before a progress marker indicated by the checkpoint have been read at least once. In an aspect, a reader can read from more than once segment of an OES, from more than one OES, etc., and as such, a reader can indicate a checkpoint in each OES or portion thereof, these checkpoints do not need to be synchronous, e.g., a reader can have read to different progress points in different segments, in different OESs, etc. Moreover, where an application has already read events up to the checkpoint at least once, the events at earlier progress points do not need to be retained, although they can be where there is not an event expiration indicated. Accordingly, events up to a checkpoint indicated by an event expiration value can be deleted, freed, released, etc. Generally, readers, groups of readers, etc., can regularly update their checkpoint(s) to enable event expiration to meaningfully advance. As an example, an application, e.g., a reader, etc., can invoke an API call, e.g. noteCheckpoint( ) etc., that can update the checkpoint of the application. In an aspect, failure of an application that has registered at-least-once semantics to report a checkpoint can result in a throwing an error, reporting an issue, etc., so that truncation of a stream, e.g., via expiring events, does not become stalled.

In an aspect, checkpoints can be aggregated. Aggregation of a checkpoint can indicate an 'oldest' checkpoint, e.g., an earliest progress point up to which expiring events can be performed. As an example, if there are checkpoints at t5, t8, t9, and t12, then events up to t5 can be removed, deleted, freed, etc., e.g., the aggregated checkpoint can be determined to be at progress point t5. In an aspect, aggregation can occur at the stream level, e.g., different readers of the same stream can be contributing to a same aggregated checkpoint so that the stream is preserved properly for all readers. Similarly, a reader reading from different streams can be contribute to different aggregated checkpoints in each stream being read so that each stream can properly preserve events correspondingly. Moreover, aggregation of checkpoints can occur across segments of an OES that can have an evolving topology, e.g., via scaling of a stream that can alter the topology of the stream. Changes in the topology of a stream can be associated with a change in stream epochs. Stream processing applications can read data from different epochs of a stream. Additionally, different readers of one stream processing application, e.g., reader, group of readers, etc., can progress independently so a checkpoint can comprise positions from two or more epochs, which can also be expressed as two separate checkpoints. Aggregation of checkpoints can result in determining a checkpoint corresponding to an earliest epoch so that all checkpoints in later epochs can be effectively ignored until the checkpoint in the earlier epoch is removed, updated, etc. This can allow an OES system to limit expending computational resources to the earlier of the stream epochs indicated by the aggregated checkpoint, e.g., at the oldest epoch among all the epochs referenced from all the checkpoints reported for a stream.

An OES stream can have a topology that evolves and corresponds to different epochs, e.g., via scaling of an OES. As an example, an OES can initially have a first segment, but where writing of events increases above a threshold level, the OES can be scaled to comprise two segments, e.g., a second segment and a third segment. In an aspect, each of the second and third segments can employ a separate processor instance to write events, e.g., scaling the OES can increase the count of processors writing events to the OES. Accordingly, a hashed key space can be divided to encompass the second and third segments of the scaled OES. As an example, the example OES initially can have the first segment covering a key space of 0 to 1, and after the scaling, the second segment can cover events from 0 to 0.25 of the key space and the third segment can cover events from 0.25 to 1 of the key space. Additionally, the scaling of the OES can constitute an epoch change, e.g., evolution of the topology of the OES, such that before the scaling the OES had the first segment in Epoch 1 and, after the scaling, the OES can have a second and third segment in Epoch 2. In an aspect, the first segment can be closed at the epoch change and the second and third segments can be opened at the epoch change. In an aspect, the topology change of the OES can result in a change in storage scheme, e.g., in the above example, reading an event with a key space value of 0.75 in the first epoch can read from the first segment and can be distinct from reading another event with a key space value of 0.75 in the second epoch that would read from the third segment. The use of different storage schemes for events of an ordered event stream (OES), e.g., an OES having different OES segment schemes as an OES advances, can require reading out OES events according to those different storage schemes.

An OES storage scheme can correspond to a distribution of a hashed key space to segments of an OES. As an example, a first OES storage scheme can have a hashed key space extends from 0 to 1, wherein a first segment can store events having a hashed key value 'y' between 0 and 0.28, e.g., $0 \leq y < 0.28$, and a second segment of the OES can store events having 'y' between 0.28 and 1, e.g., $0.28 \leq y < 1$. The example first OES storage scheme can be altered to a next storage scheme, e.g., advanced to a second epoch, wherein the first and second segment can be closed and a third and fourth segment can be opened wherein third segment can store events having a hashed key value 'y' between 0 and 0.7, e.g., $0 \leq y < 0.7$, and the fourth segment of the OES can store events having 'y' between 0.7 and 1, e.g., $0.7 \leq y < 1$. Moreover, the second epoch can end when a third epoch is begun that represents a third OES storage scheme, for example, closing the third and fourth segments and opening fifth through seventh segments, wherein the fifth segment can store events having a hashed key value 'y' between 0 and 0.1, e.g., $0 \leq y < 0.1$, the sixth segment can store can store events having 'y' between 0.1 and 0.5, e.g., e.g., $0.1 \leq y < 0.5$, and the seventh segment can store can store events having 'y' between 0.5 and 1, e.g., $0.5 \leq y < 1$.

Generally, changes to an OES storage scheme, e.g., an epoch change, etc., can be in response to an indication that computing resources are becoming sufficiently burdened. In a conventional system, an event stream can typically be evenly bifurcated, e.g., each of the two resulting event stream portions can be about one half of the initial event stream in an attempt to divide the amount of computing resources used in the initial stream about evenly between the initial computing resources and newly added additional computing resources. As an example, if an initial event stream causes a load of two units of work for a first processor, the two units of work load are correspond to an even distribution of work across the associated key space of the initial event stream, and the two units of work exceed a threshold work level of the first processor, the stream can be split and a second processor can be added, such that the first processor now supports a second stream, in lieu of the initial stream, at about one unit of work and a third stream can be supported at about one unit of work by a the second processor, again, assuming the work load from the initial stream was distributed roughly evenly across the key space of the initial event stream. In an aspect, the presently disclosed subject matter can employ improved scaling of an event stream or portion thereof, e.g., asymmetric scaling, scaling up, scaling down, scaling into more than two segments, etc. An event stream, or a stream for convenience, can be a durable, elastic, append-only, unbounded sequence of events. An example of an ordered event streaming storage platform can be STREAMING DATA PLATFORM (SDP) by DELL EMC. An event can be added to a head of a stream of events, e.g., a first event can be considered at a tail of the event stream and a most recent event can be regarded as at the head of the stream with other events ordered between the tail and the head of the stream. It is noted that some stream systems, e.g., PRAVEGA by DELL EMC can employ an inverted head/tail terminology, e.g., in PRAVEGA a first event can be added at a head of an OES, while subsequent new events can then be added to a tail of the OES, however, this is indistinguishable in all other aspects from the head/tail convention employed in the instant disclosure. Every event of the stream can have a routing key, or simply key for convenience. A key can often be derived from data of the event, e.g., a "machine-id," "location," "device type," "customer number," "vehicle identifier," etc. As such, events with the same routing key can be consumed, e.g., read, in the order they were written.

A stream can be comprised of a set of portions, e.g., segments, shards, partitions, pieces, etc., that can generally referred to as stream segments, or simply segments for convenience. The segments can act as logical containers for one or more events within a stream. When a new event is written to a stream, it can be stored to a segment of the stream based on a corresponding key. Event routing keys can be hashed to form a "key space". The key space can be employed to divide the stream into a number of parts, e.g., segments. In some embodiments, consistent hashing can be employed to assign events to appropriate segments. As an example, where a stream comprises only one segment, all events to be written to the stream are written to the same segment in an ordered manner and the segment corresponds to the entire key space. As another example, where a stream comprises two segments, the key space of the event, e.g., from zero to 'n', can be associated with the two segments, however each of the two segments can be associated with a portion of the total key space, for example, the first segment can store events with a key between zero and 'm' and the second segment can store events with a key between 'm+1' and 'n'. It will be appreciated that more segments can serve to further divide the key space such that a segment can store an event with a key falling within the range of the key space associated with that segment. As an example, a four segment event stream can have each segment store data for a quarter of the total key space, e.g., segment A can store events with keys from 0 to <0.25, segment B can store events with keys from 0.25 to <0.5, segment C can store events with keys from 0.5 to <0.75, and segment D can store events with keys from 0.75 to 1.0.

In an aspect, a segment of an event stream can generally be associated with a single processing instance to assure ordering of the events stored in the segment. A processing instance can be a single real physical processor, a virtualized processor executing on one or more real physical processors, a group of real physical processors, a group pf virtual processors executing on one or more real physical processors, etc. As an example, a processing instance can be a blade server of a rack system. As another example, a processing instance can be a virtual processor deployed in an elastic computing system, e.g., a 'cloud server,' etc.

Typically the processing instance can be associated with a level of performance which, in some embodiments, can be measured via one or more key performance indicators (KPIs) for the processing instance. As an example, a first blade server of a rack can have a first level of performance and a second blade server of a rack can have a second level of performance. In this example, where the two blade servers can comprise similar hardware and environments, they can have similar levels of performance. However, also in this example, where the two blade servers comprise different hardware and/or are in different environments, they can have different, sometimes substantially different, levels of performance. As an example, a first processing instance can perform one unit of work, a second processing instance can perform one unit of work, a third processing instance can perform five units of work, a fourth processing instances can perform three units of work, etc., where the unit of work can correspond to a number of event stream operations that can be performed by the processing instances, e.g., reads, writes, etc. In this example, the first and second processing instances can perform similar amounts of work in an event stream storage system, while the third processing instance can be capable of up to five times the work of either the first or second processing instance. Generally, the computing resources of a processing instance can be associated with costs, e.g., monetary costs, electrical consumption costs, dispersion of generated heat costs, support costs, real estate for deployment costs, etc. As such, selecting an appropriate processing instance can be associated with optimizing cost. As an example, if an event stream always consumes less than one unit of work, then pairing the stream with a processing instance that can perform one unit of work can be a better use of computing resources, e.g., lower overall aggregate costs, etc., than pairing the even stream with a processing instance that can perform 200 units of work which can result in wasting up to 199 units of work through underutilization. Moreover, in this example, the 200 unit processing instance, for example, can be a newer high end processing instance that can have a high monetary cost, and generate more heat than the one unit processing instance that, for example, can be a low cost commodity processing instance that is plentiful, has a low monetary cost, and is already widely deployed. As such, paring the one unit of work event stream with a racecar of a performance instance can be understood as possibly not being an optimal pairing in comparison to a more pedestrian performance instance.

In an aspect, transitions between OES epochs, e.g., changing OES storage schemes can be related to changing write and read demands associated with a stream of data. As an example, writing ride share service events to an OES can be according to OES segments that can divide the hashed key space into regions, e.g., a west region, a central region, and an east region. In this example, as peak demand for ride share services can be associated with the time zones, for example being busier in the east zone at local 5 pm than in the west zone that is at local 2 pm. A such, there can be more demand, in this example, to write data to the OES segment corresponding to the east region and the storage scheme can meet this demand by scaling the OES segment to allow more east region data to be written, e.g., splitting the example OES segment to more segments to allow engaging more processors, which, in some embodiments, can increase the hashed key space related to the now plural OES segments for east region event writing. Moreover, as time continues, demand can increase in the west region and wane in the east region, for example 5 pm in the west can be 8 pm in the east. As such, the east region segments can be scaled down and the west region segments can be scaled up, e.g., effectively shifting processing power to storage of west region events rather than east region events. The change in scaling of the segments of the OES can be associated with a change in storage scheme that can be referred to as a change in OES storage epochs, for example see system 200, etc. The details on epoch changes are generally outside the scope if the instant disclosure but changes in OES storage schemes can be relevant to the instant disclosure in that these epoch changes can complicate retention of events, e.g., a checkpoint in a first epoch can be distinct from a checkpoint in an second epoch, a reader initially reading events from a segment in a first epoch can transition to reading events in more, or fewer, segments in a second epoch, etc., and this can complicate reporting of checkpoints. Aggregation of checkpoints can therefore be understood to simplify determining what events should be retained across a scalable OES, as is disclosed in more detail herein below.

In an aspect, a segment can be scaled where a threshold performance occurs. As an example, an event stream segment can typically consume less than one unit of work, e.g., one unit of computing resources, and the stream segment can be associated with a processing instance that can perform up to one unit of work. However, in this example, where the segment increases demand to 1.5 units of work, the segment can be scaled, e.g., split into two daughter segments, such that each daughter segment can be associated with events for half of the key space of the parent segment before scaling. In this example, where the daughter segments are each associated with a processing instance that can perform one unit of work, and where the key space of the initial segment has a generally even distribution of work, then each daughter segment, for example, can be associate with about 0.75 units of work, e.g., the parent segment now consumes at 1.5 units, e.g., exceeding the capacity of the existing processing instance, and the parent segment can be split into two daughter segments at about 0.75 units each where each daughter segment can now consume less than the one unit of work available through their corresponding processing instances.

In an aspect, there can be additional processing, reassignment of reading instances that read events from the segment(s) of the stream, reassignment of writing instances that write events into the segment(s) of the stream, etc., effort and expense spooling up/down processing instances, etc. As such, scaling is generally not performed without impact on an event stream storage system. Returning to the above example, where the parent segment reached 80% of the one unit of work available through the corresponding processing instance, a benefit value of scaling the segment can be determined. Where the benefit value satisfies a scaling rule, the parent segment can then be scaled into the example daughter segments. The benefit value can be determined based on the expected performance of the daughter segments. As an example, if the parent segment reaches 80% consumption of computing resources, e.g., 80% work, then where the key space is evenly distributed, each daughter can be expected to inherit 40% consumption of the computing resources where each processing instance is generally capable of about one unit of work. This results in each processing instance consuming 40% less work and leaves sufficient available computing resources to allow for further increase in each of the daughter segments that could be difficult to manage if the parent segment is not scaled. This level of improvement and the resulting daughter segments being under the threshold 80% consumption of corresponding processing instance resources can be determined to satisfy the scaling rule and the segment can be scaled up. It is noted that the daughter segments can later be scaled down, e.g., combined into a single segment, combined with other segments, etc., for example, where the daughter segments begin to consume less that, for example, 20% of the available computing resources, they can be scaled down into one granddaughter segment that can consume 40% of a single processing instance. Further discussion of scaling down is generally not discussed herein for clarity and brevity, however it is expressly noted that scaling down is fully supported by the disclosed subject matter and is accordingly within the scope of the instant disclosure. In an aspect, distribution of events in a key space can be non-uniform. As an example, if an event stream has one segment that begins to consume 0.9 units of computing resources and is supported by a processing instance that can provide one unit of work with a scaling threshold value of 0.8 units, scaling can result in two daughter segments that each can consume 0.45 units of work where the work is generally evenly distributed across the key space of the parent segment, e.g., as is illustrated in an above example. However, where the distribution of work is non-uniform across the key space of the segment, for example where 0.8 units of the demand occurs in the lower half of the key space for the parent stream and only 0.1 units occurs in the upper half of the key space, then dividing the key space into daughters through symmetrical scaling, e.g., one taking the bottom half and one taking the top half of the key space, can result in one daughter segment having 0.8 units of demand and the other daughter segment having 0.1 units of demand. The daughter having 0.8 units of demand can already be ready for further scaling where the scaling threshold is 0.8 units. Use of asymmetric scaling can result in a more equitable scaling, e.g., the first daughter can inherit a portion of the parent key space having a work demand similar to the work demand from the balance of the parent key space. As such, the key space can be assigned to the daughter segments asymmetrically to enable balancing of work demanded by the resulting daughter segments.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, which can facilitate retention of an event of a segment of an ordered event stream, in accordance with aspects of the subject disclosure. System 100 can comprise a storage component 102 that can store an ordered event stream (OES) 110, 111, etc. OES 110, 111, etc., which can store one or more events. An event can be associated with a key, e.g., a routing key. A key can typically be determined from aspects of the corresponding event, although other key determination techniques can be employed. As an example, a key can be based on a characteristic of the source of the event data, such as a customer identifier, machine identifier, a location of a device providing the event data, a type of a device providing the event data, etc. Events with a same key can be written into OES 110, 111, etc., in an ordered manner. Similarly, events with a same key can be read from OES 110, 111, etc., generally in an ordered manner, e.g., generally in the order they were previously written into OES 110, 111, etc. Components providing events to be written can be termed 'writers' and components requesting events can be termed 'readers'. As such, a writer can provide an event that can be written to OES 110, 111, etc., in an ordered manner based on a key associated with the event. Similarly, a reader can receive an event from OES 110, 111, etc., based on a key.

Processor component 104 of a system 100 can receive write(s) 106 that can be written to OES 110, 111, etc., to be stored via storage component 102. Processor component 104 of a system 100 can provide access to events based on a key, e.g., as read(s) 107 that can be communicated to a reader. Generally, one processing instance, e.g., processor component 104, etc., is designated for writing events to a portion, e.g., segment, of OES 110, 111, etc. OES 110, 111, etc., can comprise one segment and/or parallel segments, e.g., stream segments, see FIG. 2, etc., that can store events according to a key. In an aspect, more than one processing instance writing to a segment of an OES is typically disfavored because it can increase the difficulty of writing incoming events in an ordered manner. However, a given processing instance can read/write to more than one OES segment, e.g., a given processing instance can write to one or more OESs, to one or more segments of one OES, to one or more segments of one or more OESs, etc. Generally, for a given number of segments there can typically be up to the same number of processing instances. Although adding more processing instances is allowable, these additional processing instances are generally idle to avoid possible scrambling of an order of events being written to a segment. It is further noted that system 100 can comprise idle processing instances, for example, as reserve processing instances for failover where an active processing instance becomes less responsive, etc. In an aspect, keys of one or more segments of an OES can represent a key space for OES 110, 111, etc., see FIG. 2, etc. Segments can therefore act as logical containers associated with a particular range of keys for an event stream and can be used to store events within an OES. When a new event is written to a stream, it can be stored to one of the segments based on the event key. In an aspect, the key space can be divided into a number of ranges that can correspond to the number of segments comprising an OES. As an example, a key space for an OES can be from 0 to 100, the OES can comprise two parallel segments wherein the first segment sequentially stores events with, for example, keys from 0 to 30 and the second segment sequentially stores events with keys from >30 to 100. In this example, a first event with a key of 54 can be appended to the second segment, a second event with a key of 29 can be appended to the first segment, a third event with a key of 14 can be further appended to the first segment after the second event, etc.

OES 110, 111, etc., as illustrated in system 100, can be a simplistic example of an OES that can comprise just one segment for storing incoming event write(s) 106 and sourcing event read(s) 107, and therefore the key space of OES 110, 111, etc., can be embodied in the example single segment of events, e.g., the key space of OES 110 is not illustrated as being distributed across more than one parallel event storage segment. Example OES 110 can have an origin terminus 112. A first event can be written at origin terminus 112. The subsequent events can then be appended at an additive terminus 114 that is typically always at the head of the stream of written ordered events, e.g., a most recent event is written to the head of example OES 110, which can provide ordering of the events being written. This can result in example OES 110 allowing for continuous and unbounded data storage that can be a durable, elastic, append-only, unbounded sequence of events. As an example, a $(K+1)^{th}$ event can be appended to the $K^{th}$ event of example OES 110 at additive terminus 114. In an aspect, storage component 102 can store any number of OESs, e.g., OES 110, 111, etc. Moreover, any one OES can comprise any number of parallel segments, e.g., stings of events for a defined key space range. Each segment can comprise an ordered sequence of stored events.

In system 100, stream passage component 120 can facilitate retention of events based on a processing application checkpoint for a segment(s) of an OES(s). In an aspect, a processing application, e.g., a reader, group of readers, etc., can indicate a checkpoint, which can be associated with a level of progress the progressing application has made in reading/processing a segment of an OES, e.g., can assure that all events up to the checkpoint have been read/processed by the processing application in accord with a retention scheme, e.g., at-least-once scheme, exactly-once scheme, etc., and therefore events with an earlier progress are eligible for expiration, e.g., can be deleted, released, removed, etc. Stream passage component 120 can receive a retention indication, e.g., a checkpoint, which can be aggregated per OES with other checkpoints to determine a passage checkpoint. Stream passage component 120 can further receive an expiration value, which can indicate a desired progress point up to which events should be deleted, etc. In an aspect, stream passage component 120 can facilitate retention of events from the passage checkpoint and can permit expiration of events prior to the passage checkpoint. As such, events up to the lesser of the expiration progress point or the passage checkpoint can be allowed to expire for a subject OES. As a first example, an expiration progress point of t5 and a progress checkpoint of t8 can be determined from aggregated checkpoints for a first OES. In this first example, events before t5 can be allowed to expire because t5<t8. As a second example, an expiration progress point of t15 and a progress checkpoint of t8 can be determined from aggregated checkpoints for a second OES. In this second example, events before t8 can be allowed to expire because t8<t15.

In an aspect, an OES, e.g., OES 110, 111, etc., can be scaled, for example, 'scaling up,' e.g., increasing a count of parallel segments of OES 110, 'scaling down,' e.g., decreasing a count of parallel segments of OES 110, etc. Moreover, OESs, or portions thereof, can be merged, e.g., can be allowed to be read out in a manner that merges the ordering of the written OES events. As an example, OES 110 and OES 111 can be merged such that reading out the merge can comprise reading out the events of each of OES 110 and 111 in an ordered sequence related to the order in which the events were written to each of OES 110 and 111. Stream passage component 120 can enable event retention for both scaled OESs and merged OESs without departing form the scope of the disclosed subject matter.

Figure 2:
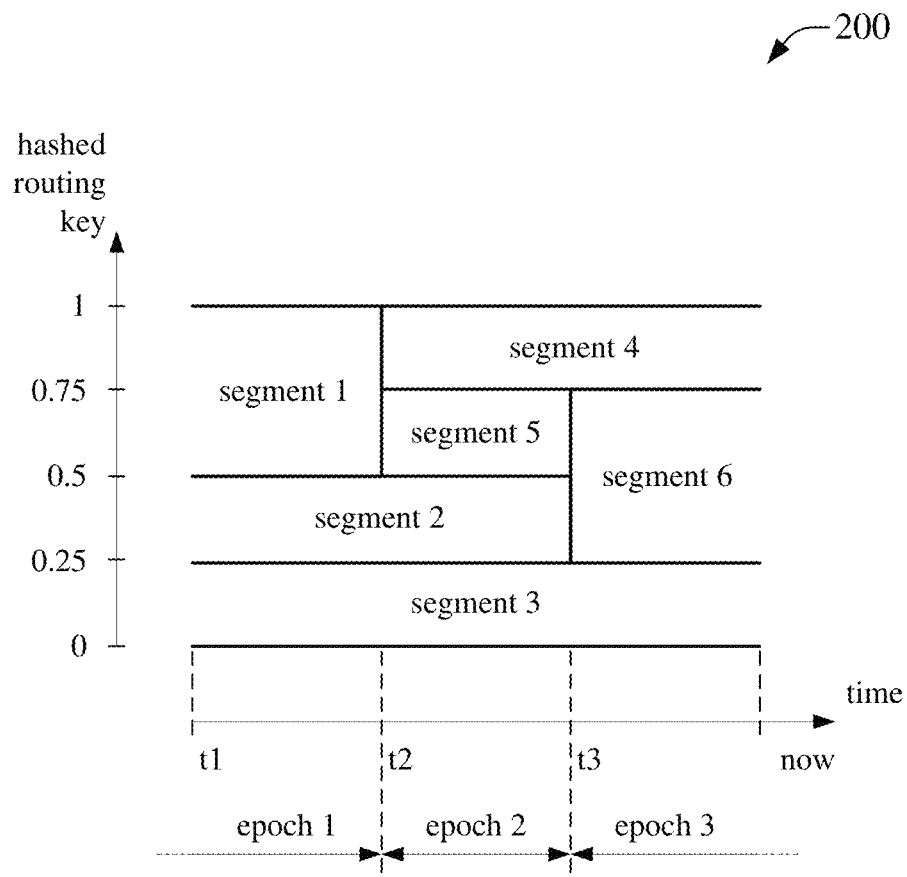
FIG. 2 is an illustration of an example scaling of an ordered event stream that can be subject to event retention policies, in accordance with aspects of the subject disclosure.

FIG. 2 is an illustration of an example scaling of an ordered event stream 200 that can be subject to event retention policies, in accordance with aspects of the subject disclosure. Ordered event stream 200 can comprise segments. OES events can be stored at progress points, for example, time, count, or some other progress metric, e.g., at a number of revolutions, at a time of day, per occurrence of a transaction, etc. Generally, for the sake of simplicity, progress is typically discussed in terms of time throughout the instant disclosure, however other progress types are expressly within the scope of the instant disclosure and can be readily employed in almost any aspect disclosed herein. At a first progress point, for example t1, OES 200 can comprise one or more parallel segments, e.g., segment 1, segment 2, segment 3, etc. At some point a segment can be scaled. As an example, at t2, segment 1 can be scaled up. This can result in causing segment 4 and segment 5 and correspondingly sealing segment 1. The topology of the OES comprising segments 1, 2, and 3 before scaling can be designated as epoch 1. Similarly, the topology of the OES comprising segments 2, 3, 4, and 5 after scaling can be designated as epoch 2.

In an aspect, segments 2 and 3 can be contiguous across epochs 1 and 2, while segment 1 can end at the transition from epoch 1 to 2. In an aspect, in epoch 1, events associated with a key between 0.5 and 1, e.g., $0.5 \leq key < 1$, can be written (and read from) segment 1, while in epoch 2, events associated with a key between 0.75 and 1, e.g., $0.75 \leq key < 1.0$, can be written (and read from) segment 4 and events associated with a key between 0.5 and 0.75, e.g., $0.5 \leq key < 0.75$, can be written (and read from) segment 5. As such, access to events for a given key can be associated with reads in different epochs. As an example, reading an event with a key of 0.8 can read from both segment 1 and segment 4. Where a read is performed from head to tail, the read of example events with a key of 0.8 can begin reading in segment 4 and then continue reading into segment 1 across the epoch boundary between epoch 2 and 1, albeit with different corresponding storage schemes used to facilitate the reading operation(s). Similarly, where the read can be from tail to head, events associated with the example key of 0.8 can begin in segment 1 and continue into segment 4 across the epoch boundary. However, it is noted that generally no additional events are written into segment 1 after a new epoch is begun.

In epoch 2, the topology of OES 200 can comprise segments 2, 3, 4, and 5. At some point further scaling can be undertaken, e.g., at t3. OES 200, for example, can scale down by ending segments 2 and 5 and starting segment 6 beginning at t3. This example scaling down can reduce a count of segments comprising OES 200. The scaling at t3 can result in ending epoch 2 and beginning epoch 3. As such, in epoch 3, the topology of the OES comprising segments 3, 4, and 6, post-scaling, can distribute the key space of OES 200, for example, as $0 \leq segment\ 3 < 0.25$, $0.25 \leq segment\ 6 < 0.75$, and $0.75 \leq segment\ 4 < 1.0$.

In an aspect, processing application can indicate checkpoints in any relevant segment. As an example, a processing application can comprise two reader components that can each read from segment 1 in epoch 1 in FIG. 2, and can accordingly indicate two checkpoints in segment 1. As the example group of readers progresses to read events past t2, for example, one reader can read from segment 4 and the other reader can read from segment 5, again each indicating a corresponding checkpoint in the appropriate segment. Moreover, in this example, the first reader can read more quickly and can progress past t3 while the second reader has not progress past t3. In this situation, the example first reader can indicate a checkpoint in segment 4 and epoch 3 while the second reader can indicate a checkpoint in segment 5 and epoch 2. Whereas checkpoints can be aggregated by OES, it can be determined that the checkpoint of the second reader is controlling and no event from this checkpoint forward in the OES should be permitted to be made expired, e.g., events of segments 2, 3, 4, and 5 are not permitted to become expired if they occur after the checkpoint of the reader progressing through segment 5 in epoch 2. Moreover, whereas epoch 2 can be determined via checkpoint aggregation to be controlling for the entire OES in the above example, any checkpoint from other processing applications occurring in epochs after epoch 2 can generally be ignored because they are not relevant where the checkpoint in a segment in epoch 2 is present.

Figure 3:
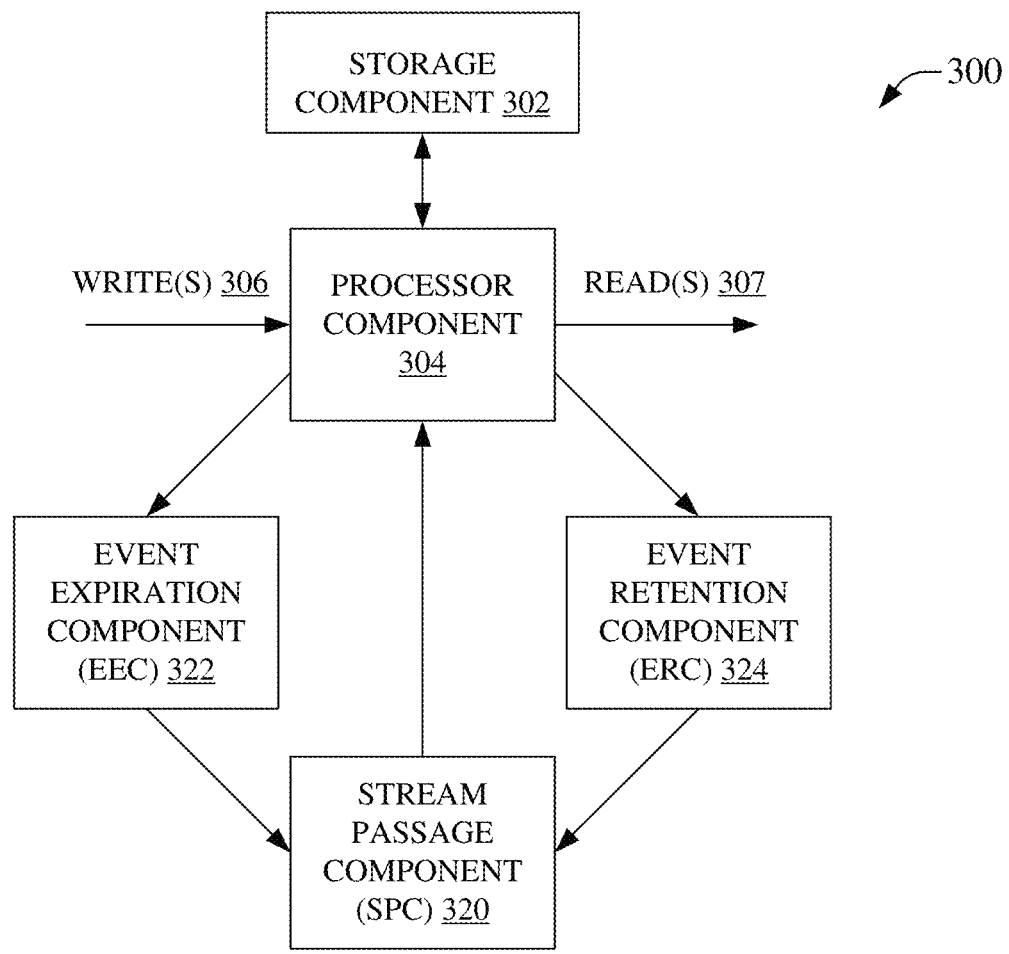
FIG. 3 illustrates an example system that can enable retention of an event of an ordered event stream based on an event expiration indicator and on an event retention indicator, in accordance with aspects of the subject disclosure.
Figure 3:
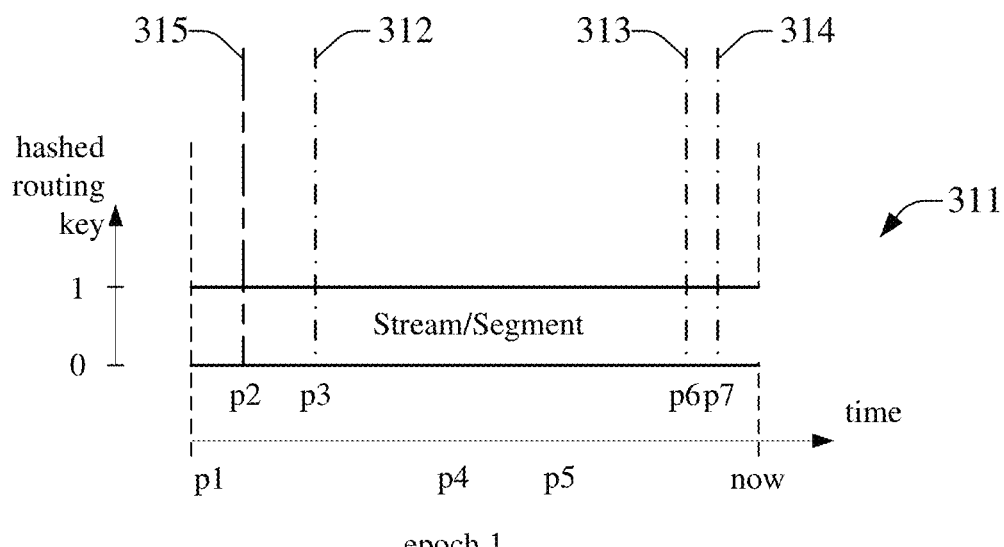

FIG. 3 is an illustration of a system 300, which can facilitate retention of an event of an ordered event stream based on an event expiration indicator and on an event retention indicator, in accordance with aspects of the subject disclosure. System 300 can comprise a storage component 302 that can store events via an OES. An event can be associated with a key that can typically be determined from a characteristic of the event data. Events with a same key can be written into a same OES or portion of an OES, e.g., an OES segment, in an ordered manner. In an aspect, events with a same key can be written to, or read from a same portion of an OES. In an aspect, the key can enable read/write of an event to a same OES segment in a same epoch, or between epochs. As a first example, an OES segment can be associated with a key space between 0.5 and 1, such that an event with a key of 0.75 can be written to, and read from, the segment. As a second example, an OES can comprise a first segment and a second segment in a first epoch, wherein the first segment can be associated with a key space of 0 to 0.75, such that an event with a key of 0.6 can be written to, or read from, the first segment. As a third example, where the OES from the second example can be scaled, causing transition to a second epoch, which can cause the first segment to end and a third and fourth segment to be started, for example, where the third segment covers a key space from 0 to 0.5 and the fourth segment can cover the key space from 0.5 to 0.75. In this third example, a first event with a first key of 0.6 before the scaling can be written to the first segment and a second event with a second key of 0.6 can be written after the scaling to the fourth segment. Accordingly, the first and second events can be read at a later time from the first segment according to a first storage scheme of the first epoch and from the fourth segment according to a second storage scheme of the second epoch. Writing events can be via write(s) 306 to one or more instances of a processor component 304 and reading events can be via read(s) 307 from one or more instances of a processor component 304.

Processor component 304 of a system 300 can receive write(s) 306 that can be written to a segment(s) of an OES to be stored via storage component 302. Processor component 304 of a system 300 can provide access to events stored in a segment(s) of an OES via storage component 302 as read(s) 307 that can be communicated to a reader. Segments can act as logical containers associated with a particular range of keys for an event stream and can be used to store events within an OES. A first event can be written at origin terminus and subsequent events can then be appended at an additive terminus that is typically always at the head of the stream of written ordered events, e.g., a most recent event is written to the head of a segment of an OES to support ordering of the events being written.

In system 300, stream passage component 320 can facilitate retention of events based on a processing application checkpoint for a segment(s) of an OES(s). In an aspect, a processing application, e.g., a reader, group of readers, etc., can indicate a checkpoint. Processor component 304 can provide the checkpoint for a reader to event retention component (ERC) 324. A checkpoint can be associated with a level of progress the processing application has made in reading/processing events of a segment of an OES and can therefore assure that all events up to the checkpoint have been read/processed by the processing application in accord with a retention scheme. A retention scheme, for example, can be an at-least-once scheme, exactly-once scheme, etc. As such, events with an earlier progress value, e.g., occurring earlier in progress than the checkpoint, can be eligible for expiration, e.g., can be deleted, released, removed, etc. In an aspect, ERC 324 can aggregate checkpoints for an OES. In some embodiments, ERC 324 can be comprised in a stream passage component (SPC), e.g., SPC 120, 320, 420, 520, etc., can be a discrete component, can be comprised in another component of an OES storage system, etc. Aggregation of checkpoints by ERC 324 can comprise storing updatable checkpoints, e.g., as a reader advances through a stream, a checkpoint for that stream can be updated accordingly. In an aspect, aggregation can enable determination of a passage checkpoint, e.g., an earliest progress value for an OES. As an example, a first reader can have read to t6 of a stream while a second reader can have read to t8 of the stream and a third reader can have read to t3 of the stream. In this example, expiring events after t3 can result in the third reader being unable to read the expired events. As such, in this example, the passage checkpoint can be determined to be at t3 based on the aggregation of the checkpoints at t6, t8, and t3. This passage checkpoint therefore can be understood to indicate a progress point of a stream, up to which point events have been read at least once, and therefore events up to this progress point can be permitted to expire where otherwise indicated, e.g., based on an expiration value. In an aspect an expiration value can be manually created, automatically created, etc.

Stream passage component 320 can further receive an expiration value, which can indicate a desired progress point up to which events should be deleted, etc. An expiration value can be determined via event expiration component (EEC) 322. In some embodiments, EEC 322 can be comprised in a stream passage component (SPC), e.g., SPC 120, 320, 420, 520, etc., can be a discrete component, can be comprised in another component of an OES storage system, etc. In an aspect, EEC 322 can determine a progress point for expiration of an event. In some embodiments, processor component 304 can indicate OES metrics to EEC 322, for example a count of events in a segment of a stream, a time an event was written into a segment of a stream, an amount of storage consumed by a segment, etc. In an aspect, EEC 322 can analyze an OES metric to determine selection of events that can be ripe for expiration. As an example, a system administrator can set a stream to retain 100 events in a segment of an OES, whereby EEC 322 can monitor the segment and can indicate events outside the most recent 100 events as eligible for expiration, e.g., a first written event can be eligible for expiration upon processor component 304 indicating a 101st event has been added to the segment via write(s) 306. Similar determinations can be made for time based metrics, memory consumption based metrics, or other OES metrics. As another example, EEC 322 can be set to indicate expiration of events more than three days old, such that a segment comprising only five events, one of which becomes four days old, can mark the four day old event as eligible for expiration. As a further example, a segment can indicate via processor component 304 to EEC 322 that the segment is being stored via a hard disk that should retain 20% free space, whereby, as the segment fills the hard disk, oldest events can be eligible for expiration when 80% of the hard disk is consumed. It is noted that eligibility for expiration can, in some instances, result in expiring the event, e.g., under an at-most-once scheme, where reading an event is not assured. However, under processing schemes that assure an event is read, e.g., at-least-once schemes, exactly-once schemes, etc., an event eligible for expiration can generally be retained. In some instances, events can be expired where other criteria can override the herein disclosed retention mechanisms, e.g., an ERC, SPC, processing application, e.g., reader/reader group, has stalled out and a storage device is nearing capacity and therefore risking failure to write new events can result in active expiring of events eligible for expiration, etc. However, generally, an event eligible for expiration can be retained until expiration is permitted based on a determination via a stream passage component, e.g., SPC 120, 320, 420, 520, etc.

An example single segment OES is illustrated at 311. The illustrated Stream/Segment can comprise events written into it, e.g., via writes(s) 306. Events can be read from the stream via read(s) 307. Example 311 can indicate three checkpoints, e.g., 312, 313, and 314. As an example, a first reader can have progressed to checkpoint 313 at progress point p6, a second reader to checkpoint 312 at progress point p3, and a third reader to checkpoint 314 at progress point p7. These checkpoints can be reported to ERC 324. ERC 324 can aggregate the checkpoints for the stream/segment, which can result in determining that the earliest progress point of the checkpoints can be at p3. SPC 320 can then permit expiration of events prior to progress point p3, e.g., of all registered processing applications, e.g., reader(s), group(s) of readers, etc., the earliest point up to which all events of the OES can be assured to have been read is at progress point p3. EEC 322 can determine a cut point 315 at progress point p2 based on OES metrics, e.g., events up to p2 can be eligible for expiration. Accordingly, SPC 320, based on cut point 315 determined by EEC 322, can indicate that events up to progress point p2 can be deleted, removed, freed, etc. In an aspect, p2<p3 which can indicate that there are no expiration eligible events that cannot be assured to have been read. In a further aspect, events between p2 and p3 can also have been read but are not indicated as eligible for expiration from the OES and can therefore be retained in example 311. Moreover, events after p3 cannot be assured to have been read by registered processing applications and can therefore be retained even if they were otherwise eligible for expiration (which they are not in example 311).

Figure 4:
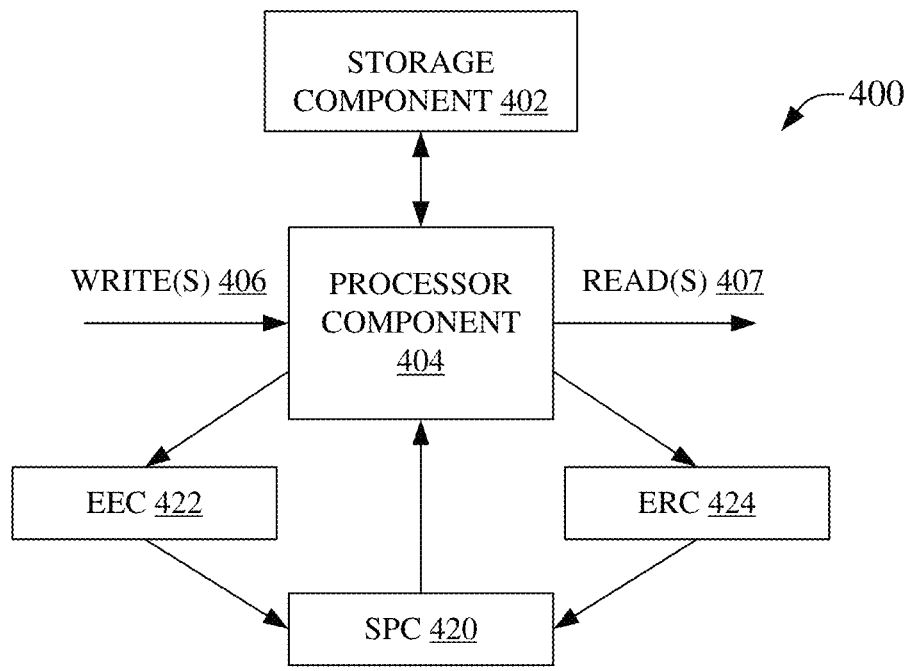
FIG. 4 is an illustration of an example system facilitating retention of an event of an ordered event stream during an advancement of an event expiration indicator, in accordance with aspects of the subject disclosure.
Figure 4:
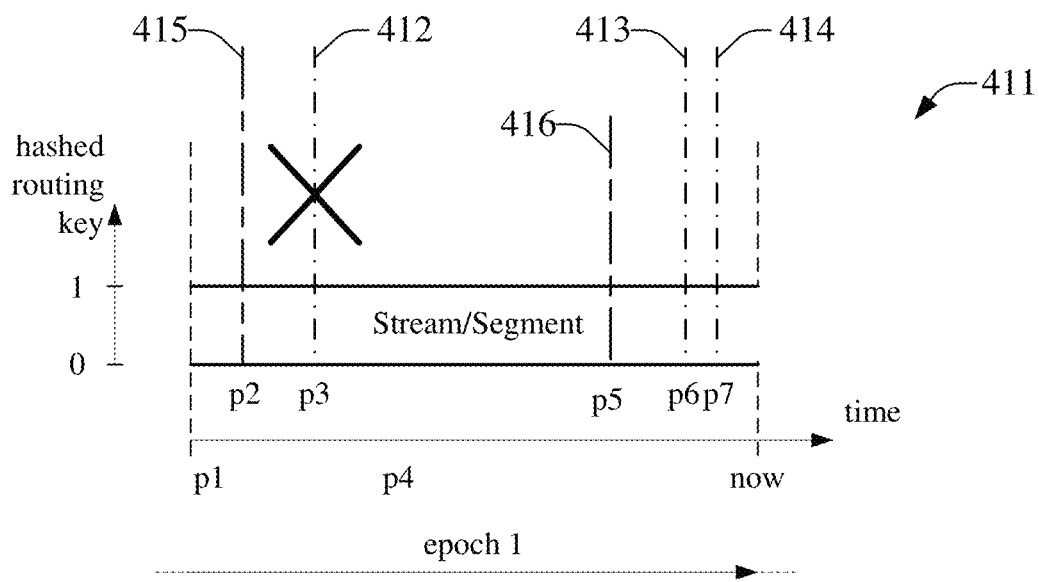

FIG. 4 is an illustration of an example system 400, which can enable retention of an event of an ordered event stream during an advancement of an event expiration indicator, in accordance with aspects of the subject disclosure. System 400 can comprise a storage component 402 that can store events via an OES. An event can be associated with a key that can typically be determined from a characteristic of the event data. Events with a same key can be written into a same OES or portion of an OES, e.g., an OES segment, in an ordered manner. In an aspect, events with a same key can be written to, or read from a same portion of an OES. In an aspect, the key can enable read/write of an event to a same OES segment in a same epoch, or between epochs.

Processor component 404 of a system 400 can receive write(s) 406 that can be written to a segment(s) of an OES to be stored via storage component 402. Processor component 404 of a system 400 can provide access to events stored in a segment(s) of an OES via storage component 402 as read(s) 407 that can be communicated to a reader. Segments can act as logical containers associated with a particular range of keys for an event stream and can be used to store events within an OES. A first event can be written at origin terminus and subsequent events can then be appended at an additive terminus that is typically always at the head of the stream of written ordered events, e.g., a most recent event is written to the head of a segment of an OES to support ordering of the events being written.

In system 400, SPC 420 can facilitate retention of events based on a processing application checkpoint for a segment(s) of an OES(s). In an aspect, a processing application can indicate a checkpoint. Processor component 404 can provide the checkpoint for a reader to ERC 424. A checkpoint can be associated with a level of progress the processing application has made in reading/processing events of a segment of an OES and can therefore assure that all events up to the checkpoint have been read/processed by the processing application in accord with a retention scheme. A retention scheme, for example, can be an at-least-once scheme, exactly-once scheme, etc. As such, events with an earlier progress value, e.g., occurring earlier in progress than the checkpoint, can be eligible for expiration, e.g., can be deleted, released, removed, etc. In an aspect, ERC 424 can aggregate checkpoints for an OES. Aggregation of checkpoints by ERC 424 can comprise storing updatable checkpoints, e.g., as a reader advances through a stream, a checkpoint for that stream can be updated accordingly. In an aspect, aggregation can enable determination of a passage checkpoint, e.g., an earliest progress value for an OES. This passage checkpoint therefore can be understood to indicate a progress point of a stream, up to which point events have been read at least once, and therefore events up to this progress point can be permitted to expire where otherwise indicated, e.g., based on an expiration value. In an aspect an expiration value can be manually created, automatically created, etc.

Stream passage component 420 can further receive an expiration value, which can indicate a desired progress point up to which events should be deleted, etc. An expiration value can be determined via EEC 422. In some embodiments, EEC 422 can be comprised in a stream passage component, e.g., SPC 120, 320, 420, 520, etc., can be a discrete component, can be comprised in another component of an OES storage system, etc. In an aspect, EEC 422 can determine a progress point for expiration of an event. In some embodiments, processor component 404 can indicate OES metrics to EEC 422, for example a count of events in a segment of a stream, a time an event was written into a segment of a stream, an amount of storage consumed by a segment, etc. In an aspect, EEC 422 can analyze an OES metric to determine selection of events that can be ready for expiration. Generally, an event eligible for expiration can be retained until expiration is permitted based on a determination via a stream passage component, e.g., SPC 120, 320, 420, 520, etc.

An example single segment OES is illustrated at 411. The illustrated Stream/Segment can comprise events written into it, e.g., via writes(s) 406. Events can be read from the stream via read(s) 407. Example 411 can indicate three checkpoints, e.g., 412, 413, and 414. As an example, a first reader can have progressed to checkpoint 413 at progress point p6, a second reader to checkpoint 412 at progress point p3, and a third reader to checkpoint 414 at progress point p7. These checkpoints can be reported to ERC 424. ERC 424 can aggregate the checkpoints for the stream/segment, which can result in determining that the earliest progress point of the checkpoints can be at p3. SPC 420 can then permit expiration of events prior to progress point p3, e.g., of all registered processing applications, e.g., reader(s), group(s) of readers, etc., the earliest point up to which all events of the OES can be assured to have been read is at progress point p3. EEC 422 can determine a cut point 415 at progress point p2 based on OES metrics, e.g., events up to p2 can be eligible for expiration. Accordingly, SPC 420, based on cut point 415, as determined by EEC 422, can indicate that events up to progress point p2 can be deleted, removed, freed, etc. Moreover, events between p2 and p3 can also have been read but are not indicated as eligible for expiration, based on cut point 415, and can therefore be retained in example 411. Further, events after p3 cannot be assured to have been read by registered processing applications and can therefore be retained even if they were otherwise eligible for expiration (which they are not in example 411).

Continuing the above example, where SPC 420 can permit expiration of events prior to progress point p3, EEC 422, for example, can next determine a second cut point 416 at progress point p5 based on further OES metrics, e.g., events up to p5 can now be eligible for expiration. Accordingly, SPC 420, based on cut point 416, as can now be determined by EEC 422, can indicate that events up to progress point p3 can be deleted, removed, freed, etc., because events between p2 and p3 can also have been read and can now be indicated as eligible for expiration, based on cut point 416, and can therefore be expired in example 411. However, events after p3 cannot be assured to have been read by registered processing applications and can therefore be retained, e.g., expiration can be prohibited or not permitted, even though they can now otherwise be eligible for expiration due to the new cut point 416 at p5.

Again continuing this current example, the processing applications update, via ERC 424, the checkpoints indicating their progressing reading events from the OES. As an example, checkpoint 412 can be removed, indicated as non-applicable, or be substituted with a later checkpoint (not illustrated). Where checkpoint 412 at progress p3 is no longer relevant in this example, SPC 420 can indicate that the earliest checkpoint of the aggregated checkpoints can be checkpoint 413 at progress p6. Accordingly, where events up to p6 are eligible for expiration. Whereas cut point 416 occurs at p5, events between p3 and p5 can now be permitted to expire. It can be observed that events between the cut point 416 at p5 and checkpoint 413 at p6 can be eligible for expiration but are retained where cut point 416 is earlier in the event progress than the checkpoint.

Figure 5:
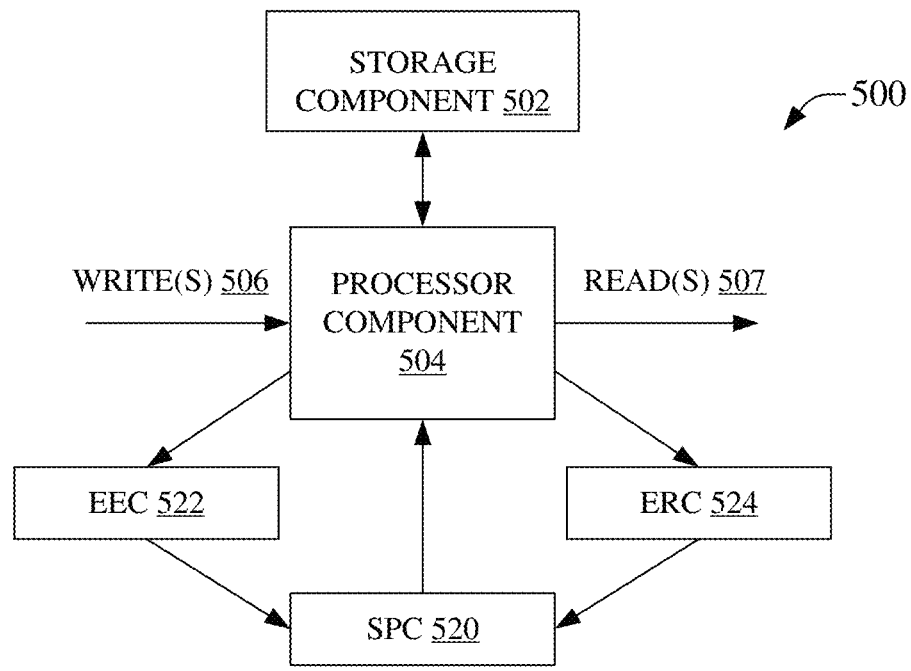
FIG. 5 is an illustration of an example system that can facilitate retention of an event of a segment of an ordered event stream employing scaling techniques, in accordance with aspects of the subject disclosure.
Figure 5:
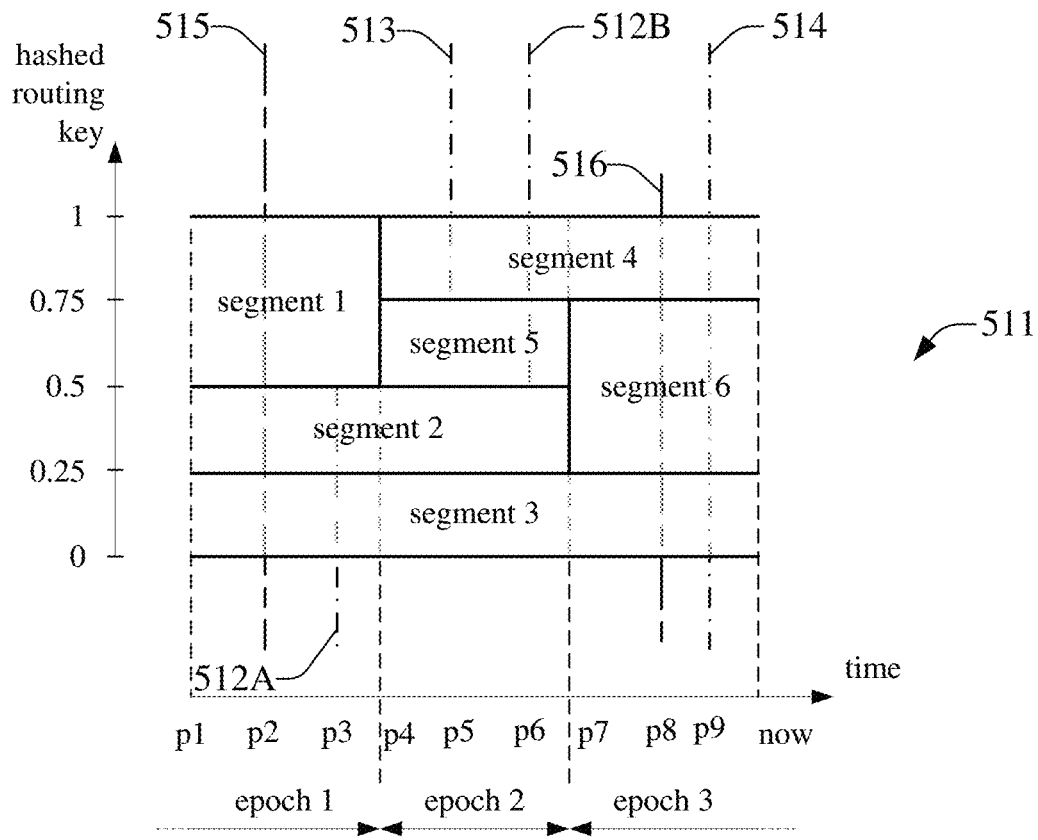

FIG. 5 is an illustration of a system 500 that can facilitate retention of an event of a segment of an ordered event stream employing scaling techniques, in accordance with aspects of the subject disclosure. System 500 can comprise a storage component 502 that can store events via a plurality of portions of an OES(s). An event can be associated with a key that can typically be determined from a characteristic of the event data. Events with a same key can be written into a same portion of an OES, e.g., an OES segment, in an ordered manner. In an aspect, events with a same key can be written to, or read from a same portion of an OES. In an aspect, the key can enable read/write of an event to a same OES segment in a same epoch, between epochs, into different OES segments between epochs, etc.

Processor component 504 of a system 500 can receive write(s) 506 that can be written to a segment(s) of an OES to be stored via storage component 502. Processor component 504 of a system 500 can provide access to events stored in a segment(s) of an OES via storage component 502 as read(s) 507 that can be communicated to a reader. Segments can act as logical containers associated with a particular range of keys for an event stream and can be used to store events within an OES. A first event can be written at origin terminus and subsequent events can then be appended at an additive terminus that is typically always at the head of the stream of written ordered events, e.g., a most recent event is written to the head of a segment of an OES to support ordering of the events being written.

In system 500, SPC 520 can facilitate retention of events based on a processing application checkpoint for a segment(s) of an OES(s). In an aspect, a processing application can indicate a checkpoint. Processor component 504 can provide the reader's checkpoint to ERC 524. A checkpoint can be associated with a level of progress the processing application has made in reading/processing events of a segment of an OES and can therefore assure that all events up to the checkpoint have been read/processed by the processing application in accord with a retention scheme. A retention scheme, for example, can be an at-least-once scheme, exactly-once scheme, etc. As such, events with an earlier progress value, e.g., occurring earlier in progress than the checkpoint, can be eligible for expiration, e.g., can be deleted, released, removed, etc. In an aspect, ERC 524 can aggregate checkpoints for an OES. Aggregation of checkpoints by ERC 524 can comprise storing updatable checkpoints, e.g., as a reader advances through a stream, a checkpoint for that stream can be updated accordingly. In an aspect, aggregation can enable determination of a passage checkpoint, e.g., an earliest progress value for an OES comprising a plurality of segments. This passage checkpoint therefore can be understood to indicate a progress point of a stream, up to which point events in all segments have been read at least once, and therefore events up to this progress point can be permitted to expire where otherwise indicated, e.g., based on an expiration value. In an aspect an expiration value can be manually created, automatically created, etc.

Stream passage component 520 can further receive an expiration value, which can indicate a desired progress point of an OES up to which events can be deleted, etc. An expiration value can be determined via EEC 522. In some embodiments, EEC 522 can be comprised in a stream passage component, e.g., SPC 120, 320, 420, 520, etc., can be a discrete component, can be comprised in another component of an OES storage system, etc. In an aspect, EEC 522 can determine a progress point for expiration of an event. In some embodiments, processor component 504 can indicate OES metrics to EEC 522, for example a count of events in a segment of a stream, a time an event was written into a segment of a stream, an amount of storage consumed by a segment, etc. In an aspect, EEC 522 can analyze an OES metric to determine selection of events of the plurality of segments of the OES that can be ready for expiration. Generally, an event eligible for expiration can be retained until expiration is permitted based on a determination via a stream passage component, e.g., SPC 120, 320, 420, 520, etc.

An example multi-segment OES is illustrated at 511. The illustrated segments can comprise events written into them, e.g., via writes(s) 506. Events can be read from the segments via read(s) 507. Example 511 can indicate four checkpoints, e.g., 512A, 512B, 513, and 514. As an example, a first reader can have progressed to checkpoint 513 at progress point p5 in epoch 2 of segment 4 of the multi-segment OES, a second reader to checkpoint 512A at progress point p3 in epoch 1 of each of segments 2 and 3, a third reader to checkpoint 512B at progress point p6 in epoch 2 of each of segments 4 and 5, and a fourth reader to checkpoint 514 at progress point p9 in epoch 3 of each of segments 3, 4, and 6. In an embodiment, the second and third reader can be part of a single reader group, e.g., a group of processing applications comprising multiple readers. A reader group can report a checkpoint that can have different progress values in different segments of a multi-segment OES. Checkpoints, e.g., from the readers and/or reader groups, can be reported to ERC 524. ERC 524 can aggregate the checkpoints, which can result in determining that the earliest progress point of the checkpoints for the multi-segment OES can be at p3, e.g., based on checkpoint 512A being earlier than any of checkpoints 512B, 513, 514, etc. SPC 520 can then permit expiration of events prior to progress point p3 because of all registered processing applications, the earliest point up to which all events of the multi-segment OES can be assured to have been read is at progress point p3. In an aspect, checkpoints in later epochs do not need to be fully processed by ERC 524 because the checkpoint in epoch 1 will be controlling. In this regard, other checkpoints that can occur in the same earliest epoch can be more fully analyzed via ERC 524 to determine which of those checkpoints can be the progress checkpoint. Additionally, EEC 522 can determine a cut point 515 at progress point p2 in epoch 1 based on OES metrics, e.g., events up to p2 can be eligible for expiration. Accordingly, SPC 520, based on cut point 515, as determined by EEC 522, can indicate that events of all segments of the OES up to progress point p2 can be deleted, removed, freed, etc. Moreover, events of the plurality of segments of the OES between p2 and p3 can also have been read but are not indicated as eligible for expiration, based on cut point 515 and p2<p3, and can therefore be retained in example 511. Further, all events of all segments occurring after p3 cannot be assured to have been read by registered processing applications and can therefore be retained even if they were otherwise eligible for expiration, which they are not at this point in example 511, e.g., the third reader can have read events up to point p6 in segment 4, however, the first reader can have only read to p5 of segment 4, and deletion of an event between p5 and p6 can be problematic for the first reader.

Continuing the above example, where SPC 520 can permit expiration of events prior to progress point p3, EEC 522, for example, can next determine a second cut point 516 at progress point p8 based on further OES metrics, e.g., events up to p8 can now be eligible for expiration. Accordingly, SPC 520, based on cut point 516 can indicate that events up to progress point p3 can be deleted, removed, freed, etc., because events between p2 and p3 can also have been read as can be assured by checkpoint 512A. It can be noted that some events in segments 1, 4, and 5 can also have been read between p3 and p5, but that the aggregated checkpoint can apply at the OES level and restrict expiration of events across all segments of an OES, rather than at a segment level within an OES. However, events in all segments of the OES after p3 cannot be assured to have been read by registered processing applications, e.g., some events of segments 2 and 3 between p3 and p5 can be unread by the second reader, etc., and can therefore be retained.

Again continuing this current example, the processing applications can update the checkpoints, via ERC 524, indicating progress in reading events from the segments comprising the OES. As an example, checkpoint 512A can be removed, indicated as non-applicable, or be substituted with a later checkpoint (not illustrated). Where checkpoint 512A at progress p3 is therefore no longer relevant in this example, SPC 520 can indicate that the earliest checkpoint of the aggregated checkpoints can be checkpoint 513 at progress p5. Accordingly, where events up to p5 can now be eligible for expiration, and whereas cut point 516 occurs at p8, events between p3 and p5 can now be permitted to expire, e.g., p5 can be the earliest aggregated checkpoint. It can be observed that events between checkpoint 513 at p5 and cut point 516 at p8 can be eligible for expiration but can be retained where checkpoint 513 is earlier in the event progress than the cut point 516.

Figure 6:
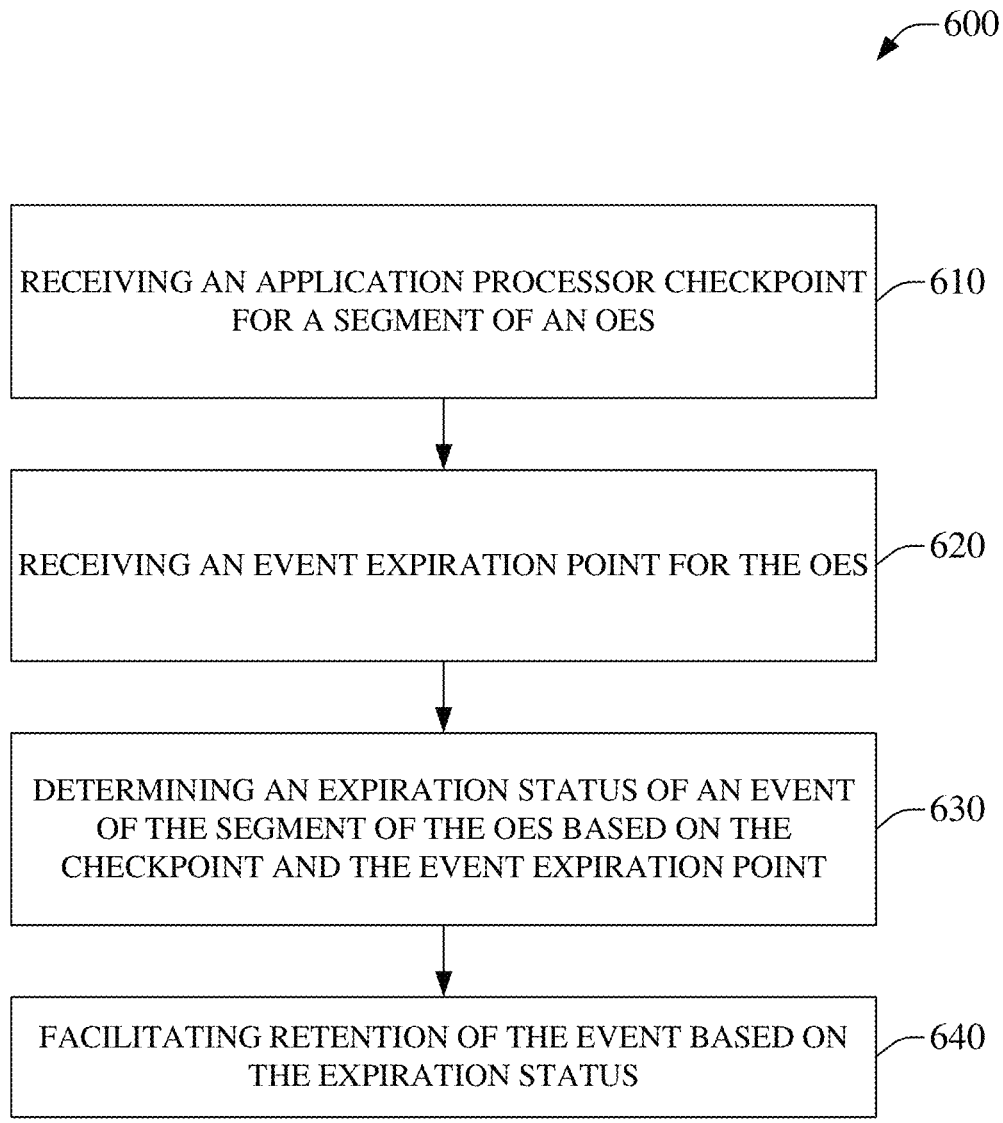
FIG. 6 is an illustration of an example method enabling retention of an event of a segment of an ordered event stream, in accordance with aspects of the subject disclosure.
Figure 7:
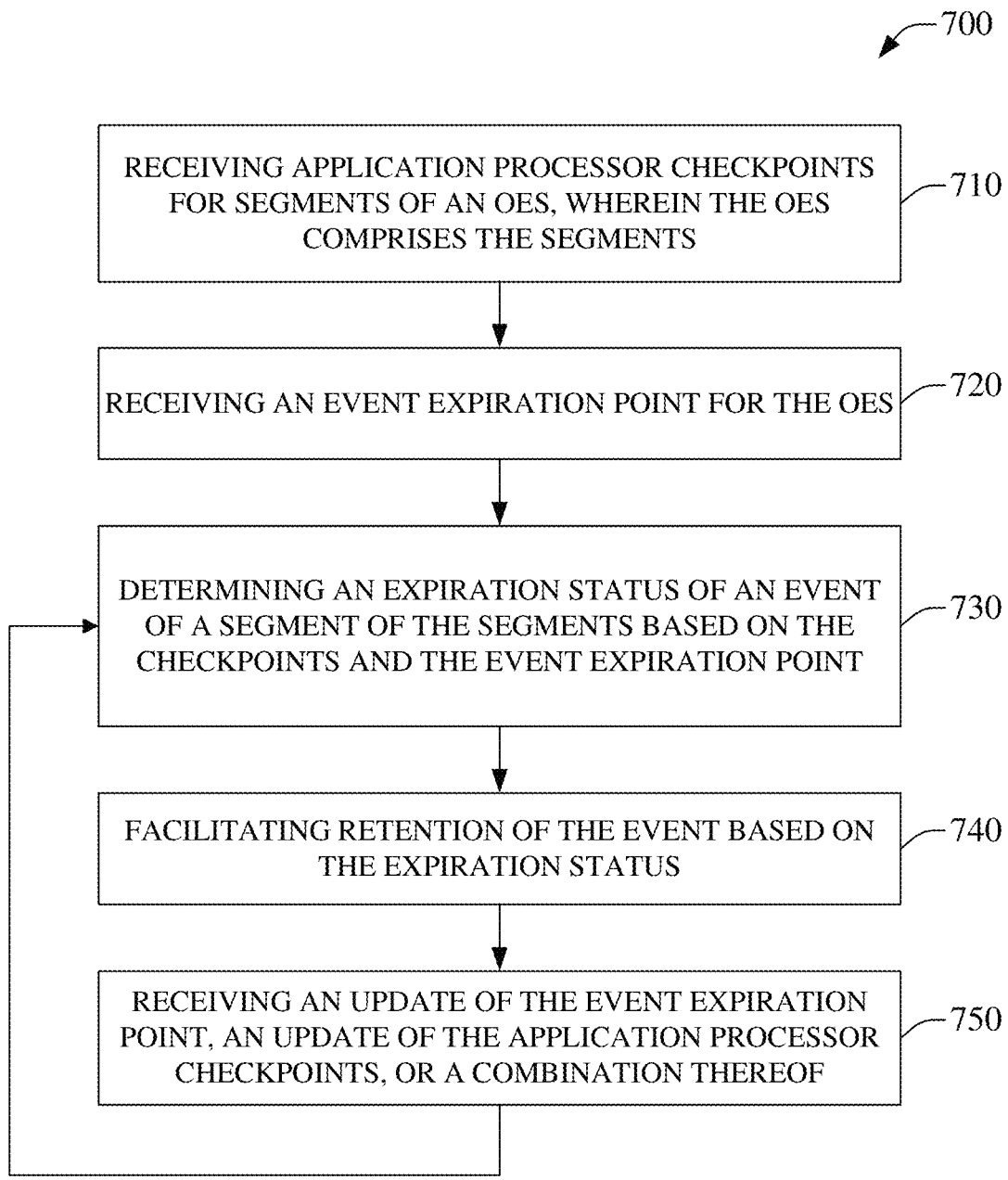
FIG. 7 is an illustration of an example method facilitating retention of an event of a segment of an ordered event stream comprising a plurality of segments and supporting updating of the retention analysis, in accordance with aspects of the subject disclosure.
Figure 8:
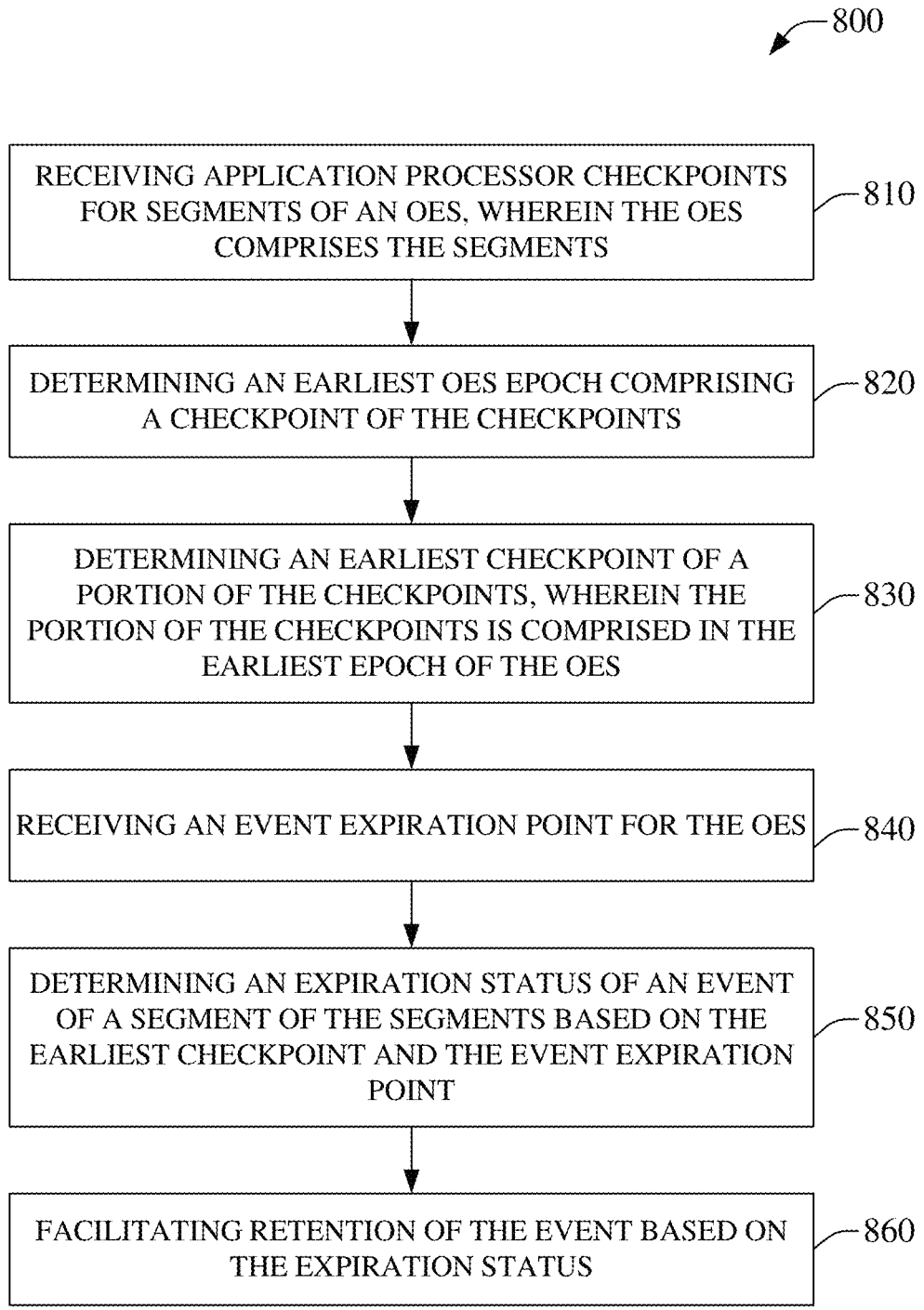
FIG. 8 is an illustration of an example method facilitating retention of an event of a segment of a multi-segment ordered event stream, wherein the retention is based on determining an earliest epoch comprising a checkpoint and the determining an earliest checkpoint of checkpoints of the earliest epoch, in accordance with aspects of the subject disclosure.

In view of the example system(s) described above, example method(s) that can be implemented in accordance with the disclosed subject matter can be better appreciated with reference to flowcharts in FIG. 6-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternately be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

FIG. 6 is an illustration of an example method 600, which can facilitate retention of an event of a segment of an ordered event stream, in accordance with aspects of the subject disclosure. At 610, method 600 can comprise receiving an application processor checkpoint, e.g., a checkpoint for a reader, group of readers, etc. The checkpoint can correspond to a segment of an OES. The checkpoint can indicate a progress point up to which the processing application can assure that all prior events have been read at least once, e.g., events occurring after the progress point generally are not assured to have been read at least once. Accordingly, for a given processing scheme, e.g., an at-least-once scheme, an only-once scheme, etc., events that can carry an assurance that they have been read at least once can be eligible for expiration, e.g., to be deleted, removed, freed, etc. Also accordingly, events that do not carry an assurance of having been read at least once can be preferentially retained at least until they have been read at least once.

At 620, method 600 can comprise receiving an event expiration point for the OES. An expiration point can indicate a progress point before which events preferentially become expired, e.g., events before the progress point can be ready for deletion, removal, etc. In an aspect, while an OES can accommodate a durable, elastic, append-only, unbounded sequence of so-called events, practical limits can apply to storage of events, e.g., it can be impractical to store all event data for all time, more especially where data in the event has become irrelevant, stale, or otherwise unimportant. As such, it can be desirable to recover storage space from some events, for example, where event storage is approaching a storage threshold/limit, where events are no longer relevant, etc. The event expiration point, e.g., a cut point, etc., can indicate a progress point, wherein events before the progress point can preferentially become expired and their storage space can be recovered. However, there can be conditions where an event has not yet been read and can fall into the preferentially expired event range. In these situations, it can be desirable to retain the event, at least until it can be read. As an example, a network connection can become slow such that reading of events also becomes slow. In this example, reading of events can fall behind the expected rate. Meanwhile, in this example, the cut point can be regularly advanced to recover storage space used by older events. Where the cut point advances ahead of the last read event, the cut point can favor expiring an unread event, which could result in a loss of data for a processing application, e.g., a reader, group of readers, etc. As such, permission to expire an event can be used to prevent loss of an event and to retain the event, despite it being behind the cut point, for a period, e.g., at least until it is read under an at-least-once scheme, an only-once, scheme, etc.

Method 600, at 630, can comprise determining an expiration status of an event of the segment of the OES based on the checkpoint and the event expiration point. In an aspect, method 600 can determine if the expiration point occurs after, at, or before the checkpoint. The expiration status can indicate that an event is not ready to be expired where the checkpoint occurs before, or at, the expiration point. The expiration status can indicate that an event can be expired where the expiration point occurs before the checkpoint. In an aspect, the expiration status can indicate permission to expire an event that is marked as ready for expiration, e.g., facilitating retention of an event that has not yet been read at least once by each processing application registered to the OES. It is noted that an event that occurs at a progress point between an earlier expiration point and a checkpoint can attain permission to become expired, but that such expiration of the event may not be ripe because the OES has not marked the event as ready for expiration, which can be understood by the event occurring more recently than the expiration point, e.g., the OES storage system is not yet seeking to expire the event because it occurs more recently than the cut point.

At 640, method 600 can comprise, facilitating retention of the event based on the expiration status. At this point method 600 can end. In an aspect, an event marked as ready for expiration, e.g., the event falling at a progress point earlier than the cut point, can be retained at 640 where the expiration status indicates that a processing application cannot assure that the event was read at least once, e.g., the event also occurs at a progress point after the checkpoint of the reader, group of readers, etc. As such, the event can generally be retained until such time as the checkpoint is advance to a progress point after the cut point, for example where the reader updates the checkpoint to indicate that there is now assurance that the event has been read, etc. Conversely, where the expiration status indicates permission to expire the event and the event is also marked as ready for expiration, the event can be allowed to become expired, e.g., the storage space for the event can be recovered, etc.

FIG. 7 is an illustration of an example method 700, which can facilitate retention of an event of a segment of an ordered event stream comprising a plurality of segments and supporting updating of the retention analysis, in accordance with aspects of the subject disclosure. At 710, method 700 can comprise receiving application processor checkpoints for segments of an OES, e.g., checkpoints for readers, groups of readers, etc., registered to at least one of a plurality of segments of an OES. The checkpoints can indicate a progress points up in the plurality of segments up to which the processing applications can assure that all prior events have been read at least once. As a first example, an OES can comprise two parallel segments, a first reader can be registered to the first segment and a second reader can be registered to the second segment, wherein the first reader can report a first checkpoint at p15 and the second reader can report a second checkpoint at p13. This example indicates that readers may not progress through all segments of an OES at the same pace and that therefore different segments can be associated with different checkpoints. As a second example, a third reader can be registered to the first segment of the above first example and can report a checkpoint of p45, e.g., more than one reader can operate in one or more of the segments of an OES and can operate at a rate independent of other readers registered to the same segment.

At 720, method 700 can comprise receiving an event expiration point for the OES. An expiration point, as is disclosed elsewhere herein, can indicate a progress point before which events preferentially become expired, e.g., events before the progress point can be ready for deletion, removal, etc. In an aspect, while an OES can accommodate a durable, elastic, append-only, unbounded sequence of so-called events, practical limits can apply to storage of events, e.g., it can be impractical to store all event data for all time, more especially where data in the event has become irrelevant, stale, or otherwise unimportant. As such, it can be desirable to recover storage space from some events, for example, where event storage is approaching a storage threshold/limit, where events are no longer relevant, etc. The event expiration point, e.g., a cut point, etc., can indicate a progress point, wherein events before the progress point can preferentially become expired and their storage space can be recovered. However, there can be conditions where an event has not yet been read and can fall into the preferentially expired event range. In these situations, it can be desirable to retain the event, at least until it can be read. As such, permission to expire an event can be used to prevent loss of an event and to retain the event, despite it being behind the cut point, for a period, e.g., at least until it is read under an at-least-once scheme, an only-once, scheme, etc.

Method 700, at 730, can comprise determining an expiration status of an event of a segment of the segments of the OES based on the checkpoints and the event expiration point. In an aspect, method 700 can determine if the expiration point occurs after, at, or before a checkpoint of the checkpoints, e.g., typically an earliest progress checkpoint of the checkpoints. The expiration status can indicate that an event is not ready to be expired where the checkpoint occurs before, or at, the expiration point. The expiration status can indicate that an event can be expired where the expiration point occurs before the checkpoint. In an aspect, the expiration status can indicate permission to expire an event that is marked as ready for expiration, e.g., facilitating retention of an event that has not yet been read at least once by each processing application registered to the segment of the segments of the OES. In an embodiment, the earliest progress checkpoint can prohibit expiring of events in all segments of the OES from the checkpoint forward. As an example, an OES can comprise two parallel segments, a first reader can be registered to the first segment and a second reader can be registered to the second segment, wherein the first reader can report a first checkpoint at p25 and the second reader can report a second checkpoint at p13, wherein an expiration point can be at p18, and wherein events in both the first and second segments from p13 onward are retained while events up to p13 can be deleted, etc., where they fall before the cut point at p18 and before the earliest checkpoint at p13. In this example, events between p13 and p18 can be retained despite being marked as ready for expiration because there is not an assurance that they have been read at least once.

At 740, method 700 can comprise, facilitating retention of the event based on the expiration status. In an aspect, an event marked as ready for expiration, e.g., the event falling at a progress point earlier than the cut point, can be retained at 740 where the expiration status indicates that a processing application cannot assure that the event was read at least once, e.g., the event also occurs at a progress point after the checkpoint of the reader, group of readers, etc. As such, the event can generally be retained until such time as the checkpoint is advance to a progress point after the cut point, for example where the reader updates the checkpoint to indicate that there is now assurance that the event has been read, etc. Conversely, where the expiration status indicates permission to expire the event and the event is also marked as ready for expiration, the event can be allowed to become expired, e.g., the storage space for the event can be recovered, etc.

At 750, method 700 can comprise receiving an update of the event expiration point, the checkpoints, or both, which can return method 700 to 730 for an additional iteration. Generally speaking, an iteration of method 700 from 730 to 750 can be repeated in response to updates to the cut point or the progress of readers, and does not need to end. However, in some circumstances method 700 can be run in a single iteration and can end after 740, for example, executing method 700 on a fixed data set that is not actively updated, etc.

FIG. 8 is an illustration of an example method 800, which can enable retention of an event of a segment of a multi-segment ordered event stream, wherein the retention is based on determining an earliest epoch comprising a checkpoint and the determining an earliest checkpoint of checkpoints of the earliest epoch, in accordance with aspects of the subject disclosure. At 810, method 800 can comprise receiving application processor checkpoints for segments of an OES, e.g., checkpoints for readers, groups of readers, etc., registered to at least one of a plurality of segments of an OES. The checkpoints can indicate a progress points up in the plurality of segments up to which the processing applications can assure that all prior events have been read at least once. In an aspect, processing applications may not progress through all segments of an OES at the same pace and that therefore different segments can be associated with different checkpoints. In another aspect, more than one processing application can operate in one or more of the segments of an OES and can operate at a rate independent of other readers registered to the same segment.

Method 800, at 820, can comprise determining an earliest OES epoch comprising a checkpoint of the checkpoints. In an aspect, an OES can comprise a plurality of epochs where, for example, an OES has been scaled up, scaled down, etc. In this regard, an earliest epoch comprising at least one of the checkpoints from 810 can be associated with an earlier progress point than any event of a later epoch. As such, the checkpoints can be analyzed to determine an earliest epoch, which can act as a filter for events that would necessarily occur at a later progress point due to being included in a later epoch.

At 830, method 800 can comprise determining an earliest checkpoint of a portion of the checkpoints. In an aspect, the portion of the checkpoints can be the portion that occurs in the earliest epoch. As an example, if there are three checkpoints in segments of a first epoch and five checkpoints in segments of a second epoch and the second epoch occurs at a later progress point than the first epoch, then the earliest of the three checkpoints of the first epoch can be determined without needing to consider the five checkpoints of the second epoch which, due to being in the second epoch, must occur at a later progress point than any of the three checkpoints of the first epoch. Method 800 at 820 and 830, in this example, can therefore avoid needing to compare eight checkpoints to determine an earliest checkpoint and can, in a manner of speaking, first filter checkpoints by epoch, then find an earliest checkpoint in the earliest epoch. In some embodiments this can be more efficient than determining an earliest checkpoint of a full group of checkpoints from all epochs.

At 840, method 800 can comprise receiving an event expiration point for the OES. An expiration point, as is disclosed elsewhere herein, can indicate a progress point before which events preferentially become expired, e.g., events before the progress point can be ready for deletion, removal, etc. In an aspect, while an OES can accommodate a durable, elastic, append-only, unbounded sequence of so-called events, practical limits can apply to storage of events, e.g., it can be impractical to store all event data for all time, more especially where data in the event has become irrelevant, stale, or otherwise unimportant. As such, it can be desirable to recover storage space from some events, for example, where event storage is approaching a storage threshold/limit, where events are no longer relevant, etc. The event expiration point, e.g., a cut point, etc., can indicate a progress point, wherein events before the progress point can preferentially become expired and their storage space can be recovered. However, there can be conditions where an event has not yet been read and can fall into the preferentially expired event range. In these situations, it can be desirable to retain the event, at least until it can be read. As such, permission to expire an event can be used to prevent loss of an event and to retain the event, despite it being behind the cut point, for a period, e.g., at least until it is read under an at-least-once scheme, an only-once, scheme, etc.

Method 800, at 850, can comprise determining an expiration status of an event of a segment of the segments of the OES based on the earliest checkpoint, as determined at 830, and the event expiration point. In an aspect, method 800 can determine if the expiration point occurs after, at, or before the earliest checkpoint of the checkpoints. The expiration status can indicate that an event is not ready to be expired where the earliest checkpoint occurs before, or at, the expiration point. The expiration status can indicate that an event can be expired where the expiration point occurs before the earliest checkpoint. In an aspect, the expiration status can indicate permission to expire an event that is marked as ready for expiration, e.g., facilitating retention of an event that has not yet been read at least once by each processing application registered to the segment of the segments of the OES. In an embodiment, the earliest checkpoint can prohibit expiring of events in all segments of the OES from the progress point corresponding to the earliest checkpoint forward.

At 860, method 800 can comprise, facilitating retention of the event based on the expiration status. At this point method 800 can end. In an aspect, an event marked as ready for expiration, e.g., the event falling at a progress point earlier than the cut point, can be retained at 860 where the expiration status indicates that a processing application cannot assure that the event was read at least once, e.g., the event also occurs at a progress point after the earliest checkpoint. As such, the event can generally be retained until such time as the earliest checkpoint is advanced to a progress point after the cut point, for example where the reader updates the checkpoints and a new earliest checkpoint can indicate that there is now assurance that the event has been read, etc. Conversely, where the expiration status indicates permission to expire the event and the event is also marked as ready for expiration, the event can be allowed to become expired, e.g., the storage space for the event can be recovered, etc.

Figure 9:
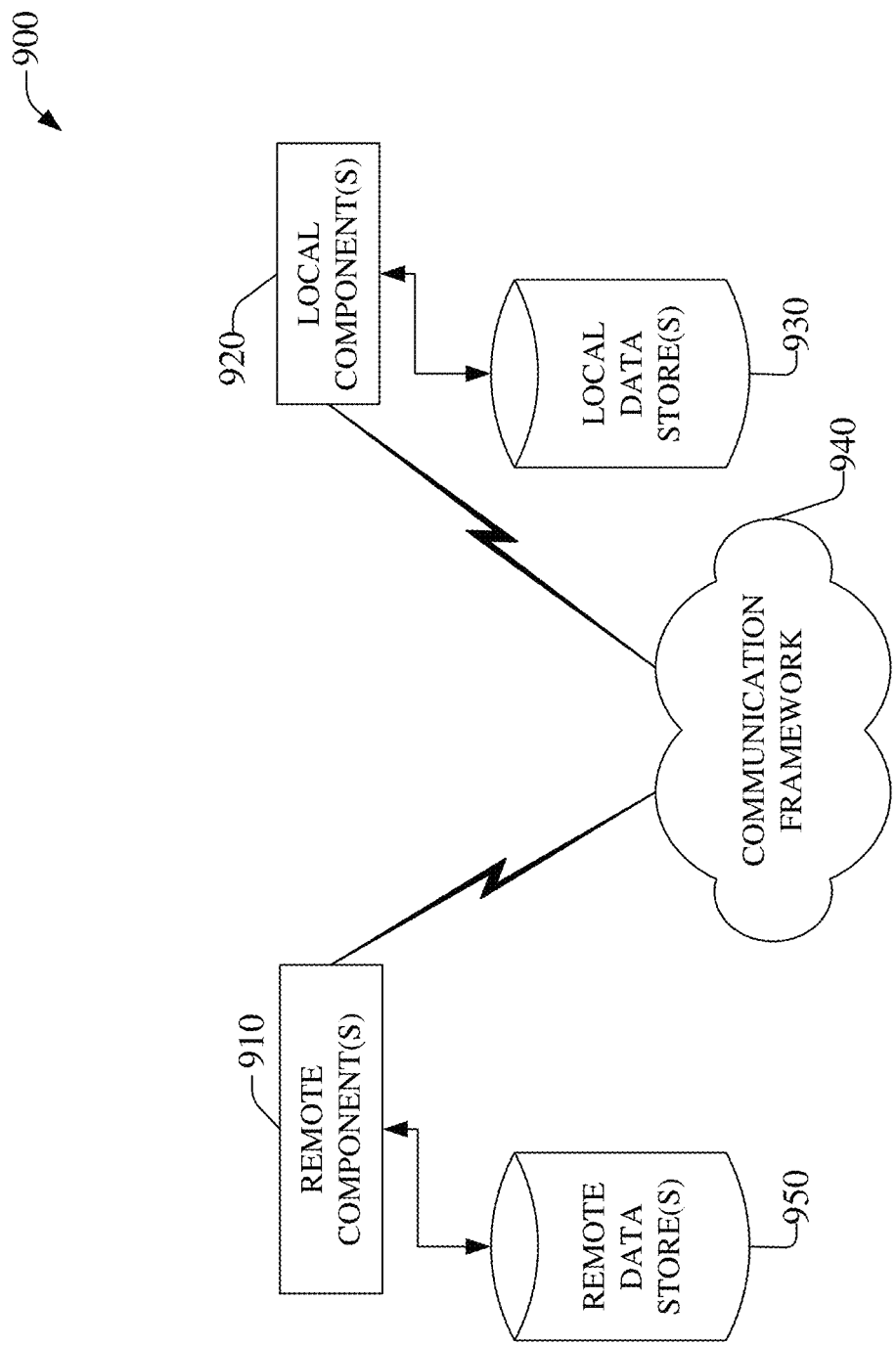
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a remotely located device comprised in storage component 102, 302, 402, 502, etc., a remotely located processor device comprised in processor component 104, 304, 404, 504, etc., a remotely located device comprised in stream passage component 120, 320, 420, 520, etc., a remotely located device comprised in EEC 322, 422, 522, etc., a remotely located device comprised in ERC 324, 424, 524, etc., connected to a local component via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise a local device comprised in storage component 102, 302, 402, 502, etc., a local processor device comprised in processor component 104, 304, 404, 504, etc., a local device comprised in stream passage component 120, 320, 420, 520, etc., a local device comprised in EEC 322, 422, 522, etc., a local device comprised in ERC 324, 424, 524, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, writing, reading, erasing, expiring, etc., of events of segments of an OES(s) in systems 100, 200, 300, 400, 500, etc., can be communicated via communication framework 940 among storage components of an OES storage network 100, 200, 300, 400, 500, etc., e.g., to facilitate adapting, altering, modifying, erasing, deleting, freeing, etc., events stored via one or more OES(s), as disclosed herein.

Figure 10:
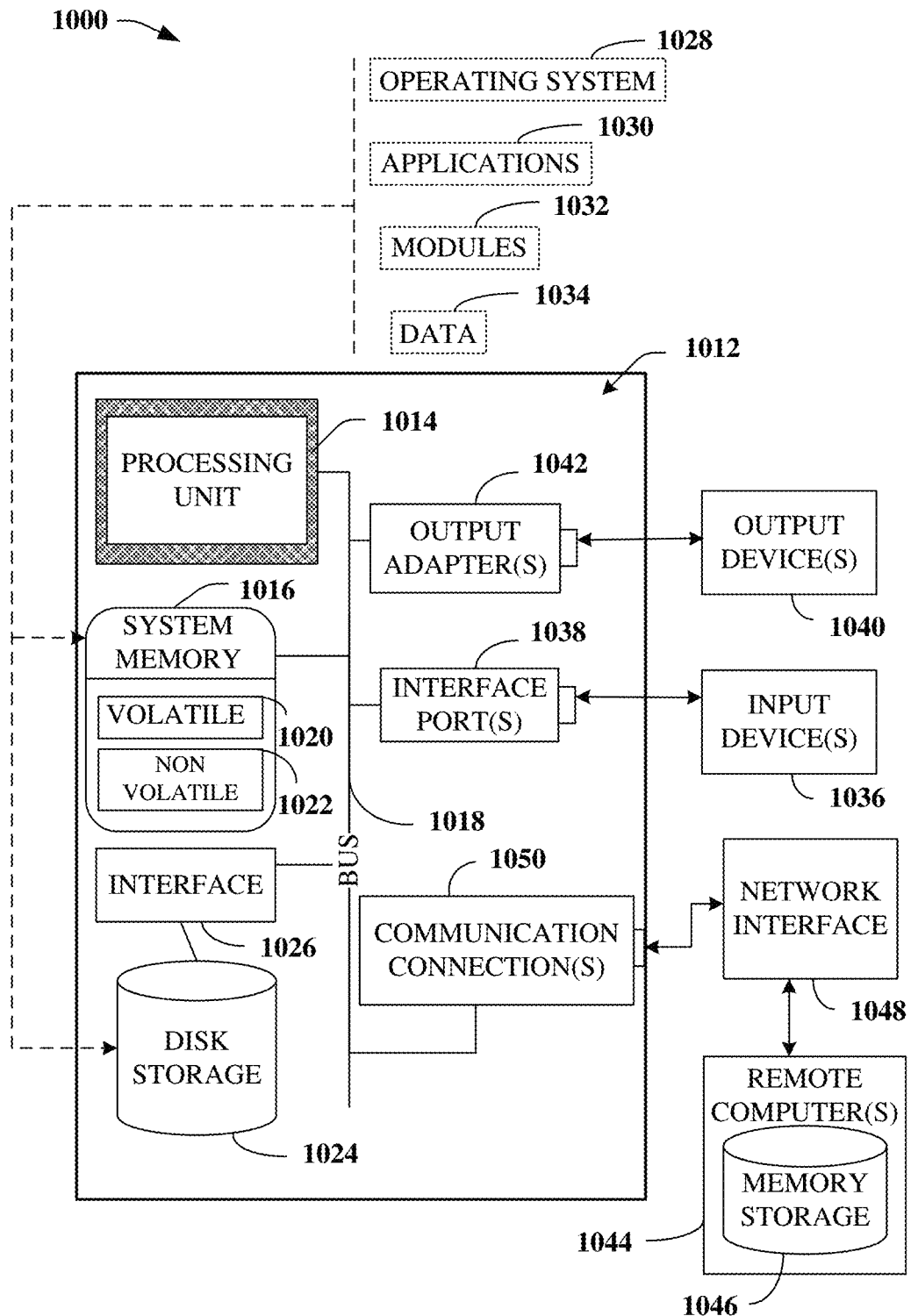
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in any of storage component 102, processor component 104, stream merging component 120, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations comprising receiving a first application processor checkpoint and an event expiration point. The example first application processor checkpoint can correspond to a first segment of an ordered event stream and the ordered event stream can also comprise a second segment that can correspond to a second application processor checkpoint. Further, in the example, deletion of the event can be blocked in response to determining that the first application processor checkpoint occurs at a lesser progress point than the event expiration point. As an example, in the first application processor checkpoint occurs at t5 and the event expiration point occurs at t8, then deletion of events after t5 can be blocked.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial bus port can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A and a second embodiment that has aspect B does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
    a processor; and
    a memory that stores executable instructions that, when executed by the processor, facilitate performance of operations, comprising:
        receiving a first application processor checkpoint corresponding to a first segment of an ordered event stream, wherein the ordered event stream is stored via an ordered event stream storage system;
        receiving an event expiration point corresponding to the ordered event stream, and
        in response to determining an expiration status of an event stored via the first segment of the ordered event stream based on the first application processor checkpoint and the event expiration point, causing retention of the event in the ordered event stream.

2. The system of claim 1, wherein:
    the expiration status indicates that the event expiration point occurs at an earlier progress point than the first application processor checkpoint; and
    the facilitating the retention of the event results in prohibiting deletion of the event.

3. The system of claim 1, wherein:
    the expiration status indicates that the event expiration point occurs at a later progress point than the first application processor checkpoint; and
    the facilitating the retention of the event results in permitting deletion of the event.

4. The system of claim 1, wherein the operations further comprise:
    determining that the first application processor checkpoint is an earliest checkpoint of checkpoints comprising the first application processor checkpoint and a second application processor checkpoint corresponding to a second segment of the ordered event stream.

5. The system of claim 4, wherein the second segment is a same segment as the first segment.

6. The system of claim 4, wherein the second segment is a different segment that the first segment.

7. The system of claim 6, wherein the first segment is in a first epoch that is a different epoch than a second epoch comprising the second segment.

8. The system of claim 7, wherein the determining that the first application processor checkpoint is an earliest checkpoint comprises:
    determining that the first segment is comprised in the first epoch;
    determining that the second segment is comprised in the second epoch;
    determining that the first epoch occurs at an earlier progress point than the second epoch; and
    determining that the first application processor checkpoint is an earlier application processor checkpoint than any other application processor checkpoints comprised in any segments of the OES comprised in the first epoch.

9. The system of claim 7, wherein first epoch and the second epoch are a result of scaling the ordered event stream.

10. The system of claim 4, wherein the determining that the first application processor checkpoint is an earliest checkpoint of checkpoints comprising the first application processor checkpoint and a second application processor checkpoint corresponding to a second segment of the ordered event stream results in facilitating retention of another event stored via the second segment.

11. The system of claim 1, wherein a processor application corresponding to the first application processor checkpoint designates a processing scheme selected from a group of processing schemes comprising an at-least-once scheme and an exactly-once scheme.

12. A non-transitory machine-readable medium, comprising executable instructions that, when executed by a processor, facilitate performance of operations, comprising:
receiving a first application processor checkpoint and an event expiration point, wherein the first application processor checkpoint corresponds to a first segment of an ordered event stream, wherein the ordered event stream further comprises a second segment, and wherein a second application processor checkpoint corresponds to the second segment; and
in response to determining that the first application processor checkpoint occurs at a lesser progress point than the event expiration point, blocking deletion of the event.

13. The non-transitory machine-readable medium of claim 12, wherein the operations further comprise:
determining that the first application processor checkpoint occurs in a first epoch of the ordered event stream;
determining that the second application processor checkpoint occurs in a second epoch of the ordered event stream; and
determining that the first epoch occurs at a lesser progress point than the second epoch.

14. The non-transitory machine-readable medium of claim 13, wherein the operations further comprise determining that the first application processor checkpoint occurs at a lesser progress point that all other application processor checkpoints of the first epoch.

15. The non-transitory machine-readable medium of claim 12, wherein the first application processor checkpoint is updatable, and wherein the event expiration point is updateable.

16. A method, comprising:
receiving, by a system comprising a processor, a first application processor checkpoint corresponding to a first segment of an ordered event stream, wherein the ordered event stream is stored via an ordered event stream storage system;
receiving, by the system, an event expiration point corresponding to the ordered event stream, and
in response to determining an expiration status of an event stored via the first segment of the ordered event stream based on the first application processor checkpoint and the event expiration point, causing, by the system, deletion of the event in the ordered event stream.

17. The method of claim 16, wherein the determining the expiration status comprises determining, by the system, that the first application processor checkpoint occurs at a first progress point, that a second application processor checkpoint occurs at a second progress point, and that the first progress point is an earlier progress point than the second progress point.

18. The method of claim 17, wherein the determining that the first progress point is an earlier progress point than the second progress point comprises determining, by the system, that a first epoch comprises the first progress point, that a second epoch comprises the second progress point, and that the first epoch occurs at an earlier progress point than the second epoch.

19. The method of claim 18, further comprising determining, by the system, that the first progress point occurs at an earlier progress point that other progress points comprised in the first epoch.

20. The method of claim 16, wherein the determining the expiration status comprises determining that the first application processor checkpoint occurs at a later progress point than the event expiration point, resulting in the expiration status being indicative of permitting deletion of the event.

* * * * *